(12) United States Patent
Li et al.

(10) Patent No.: US 12,153,944 B2
(45) Date of Patent: Nov. 26, 2024

(54) SYSTEMS, METHODS, AND MEDIA FOR TRUSTED HYPERVISORS

(71) Applicants: Shih-Wei Li, New York, NY (US); Jason Nieh, New York, NY (US); John S. Koh, Ridgefield, NJ (US)

(72) Inventors: Shih-Wei Li, New York, NY (US); Jason Nieh, New York, NY (US); John S. Koh, Ridgefield, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 112 days.

(21) Appl. No.: 16/916,051

(22) Filed: Jun. 29, 2020

(65) Prior Publication Data
US 2020/0409740 A1    Dec. 31, 2020

Related U.S. Application Data

(60) Provisional application No. 62/867,808, filed on Jun. 27, 2019.

(51) Int. Cl.
*G06F 9/455* (2018.01)
*G06F 9/4401* (2018.01)
(Continued)

(52) U.S. Cl.
CPC ........ *G06F 9/45558* (2013.01); *G06F 9/4401* (2013.01); *G06F 9/5077* (2013.01); *G06F 21/44* (2013.01); *G06F 2009/45587* (2013.01)

(58) Field of Classification Search
CPC .. G06F 9/45558; G06F 9/4401; G06F 9/5077; G06F 21/44; G06F 2009/45587
See application file for complete search history.

(56) References Cited

U.S. PATENT DOCUMENTS

| | | |
|---|---|---|
| 6,810,442 B1 | 10/2004 | Lin et al. |
| 7,869,425 B2 | 1/2011 | Elliott et al. |

(Continued)

FOREIGN PATENT DOCUMENTS

WO    WO 2019108676    6/2019

OTHER PUBLICATIONS

Accetta, M., et al., "Mach: A New Kernel Foundation for UNIX Development", in Proceedings of the Summer USENIX Conference, Atlanta, GA, US, Jun. 1986, pp. 1-16.

(Continued)

*Primary Examiner* — Jacob D Dascomb
(74) *Attorney, Agent, or Firm* — Byrne Poh LLP

(57) ABSTRACT

Systems comprising: a memory; and a hardware processor and configured to: execute a hypervisor having a first portion and a second portion, wherein the first portion of the hypervisor executes at a first exception level that allows the first portion to access data of a virtual machine in the hardware processor and the memory, and wherein the second portion of the hypervisor executes at a second exception level that prevents the second portion from accessing the data of the virtual machine in the hardware processor and the memory. Methods comprising: executing a first portion of a hypervisor at a first exception level that allows the first portion to access data of a virtual machine in a hardware processor and memory; and executing a second portion of a hypervisor at a second exception level that prevents the second portion from accessing the data in the hardware processor and the memory.

21 Claims, 5 Drawing Sheets

(51) Int. Cl.
    *G06F 9/50*    (2006.01)
    *G06F 21/44*   (2013.01)

(56) References Cited

U.S. PATENT DOCUMENTS

| | | | |
|---|---|---|---|
| 7,877,659 | B2 | 1/2011 | Geller et al. |
| 7,895,643 | B2 | 2/2011 | Yung et al. |
| 8,117,445 | B2 | 2/2012 | Werner et al. |
| 8,656,482 | B1* | 2/2014 | Tosa .................. G06F 21/60 |
| | | | 713/153 |
| 9,009,823 | B1 | 4/2015 | Ismael et al. |
| 9,525,666 | B2 | 12/2016 | Inforzato et al. |
| 9,665,708 | B2 | 5/2017 | Fanton et al. |
| 10,235,175 | B2 | 3/2019 | Dixon et al. |
| 10,331,829 | B2 | 6/2019 | Kailas |
| 10,496,574 | B2 | 12/2019 | Fleming et al. |
| 10,650,174 | B1 | 5/2020 | Wilmot et al. |
| 2006/0047958 | A1* | 3/2006 | Morais .................. G06F 21/51 |
| | | | 713/166 |
| 2009/0043985 | A1* | 2/2009 | Tuuk .................. G06F 12/1036 |
| | | | 711/E12.004 |
| 2009/0328045 | A1 | 12/2009 | Burckhardt et al. |
| 2009/0328195 | A1* | 12/2009 | Smith .................. G06F 21/575 |
| | | | 726/16 |
| 2010/0114618 | A1 | 5/2010 | Wilcock et al. |
| 2012/0144376 | A1 | 6/2012 | Van Eijndhoven et al. |
| 2014/0245444 | A1* | 8/2014 | Lutas .................. G06F 21/56 |
| | | | 726/24 |
| 2015/0254330 | A1 | 9/2015 | Chan et al. |
| 2015/0370591 | A1* | 12/2015 | Tuch .................. G06F 9/45558 |
| | | | 718/1 |
| 2016/0275016 | A1* | 9/2016 | Mukherjee .......... G06F 12/1054 |
| 2017/0024508 | A1 | 1/2017 | Mneimneh et al. |
| 2018/0113816 | A1* | 4/2018 | Hellwig .................. G06F 21/53 |
| 2018/0332064 | A1 | 11/2018 | Harris et al. |
| 2020/0167467 | A1 | 5/2020 | Saxena et al. |
| 2021/0067526 | A1 | 3/2021 | Fahrny et al. |
| 2022/0019514 | A1 | 1/2022 | Gu et al. |

OTHER PUBLICATIONS

Adams, K. and Agesen, O., "A Comparison of Software and Hardware Techniques for x86 Virtualization", in ACM SIGPLAN Notices, vol. 41, No. 11, Nov. 2006, pp. 2-13.
Advanced Micro Devices, "Secure Encrypted Virtualization API Version 0.16", Technical Report, Feb. 2018, pp. 1-99, available at: http://developer.amd.com/wordpress/media/2017/11/55766_SEV-KM-API_Specification.pdf.
Alglave, J., et al., "Software Verification for Weak Memory via Program Transformation", in Proceedings of the 22nd European Conference on Programming Languages and Systems, Rome, IT, Mar. 16-24, 2013, pp. 1-21.
Amazon Web Services, "AWS Key Management Service (KMS)", last accessed Jul. 26, 2021, pp. 1-7, available at: https://aws.amazon.com/kms/.
Amazon Web Services, "Introducing Amazon EC2 A1 Instances Powered by New Arm-based AWS Graviton Processors", Nov. 26, 2018, pp. 1-3, available at: https://aws.amazon.com/about-aws/whats-new/2018/11/introducing-amazon-ec2-a1-instances/.
Archwiki, "dm-crypt", last updated Jun. 9, 2021, pp. 1-2, available at: https://wiki.archlinux.org/title/dm-crypt.
ARM Ltd., "ARM Security Technology: Building a Secure System using TrustZone Technology", Technical Report, Apr. 2009, pp. 1-108.
ARM Ltd., "ARM System Memory Management Unit Architecture Specification: SMMU Architecture Version 2.0", Technical Report, Jun. 2016, pp. 1-372.
Azab, A.M., et al., "HyperSentry: Enabling Stealthy In-Context Measurement of Hypervisor Integrity", in Proceedings of the 17th ACM Conference on Computer and Communications Security, Chicago, IL, US, Oct. 4-8, 2010, pp. 1-12.

Backes, M., et al., "Preventing Side-Channel Leaks in Web Traffic: A Formal Approach", in Proceedings of the 20th Annual Network and Distributed System Security Symposium (NDSS '13), San Diego, CA, US, Feb. 24-27, 2013, pp. 1-17.
Barham, P., et al., "Xen and the Art of Virtualization", in Proceedings of the 19th ACM Symposium on Operating Systems Principles (SOSP '03), Bolton Landing, NY, US, Oct. 19-22, 2003, pp. 1-14.
Batty, M., et al., "The Problem of Programming Language Concurrency Semantics", in Proceedings of the European Symposium on Programming Languages and Systems, London, UK, Apr. 11-18, 2015, pp. 1-25.
Baumann, A., et al., "Shielding Applications from an Untrusted Cloud with Haven", in Proceedings of the 11th USENIX Conference on Operating Systems Design and Implementation, Broomfield, CO, US, Oct. 6-8, 2014, pp. 1-19.
Baumann, C., et al., "A High Assurance Virtualization Platform for ARMv8", in Proceedings of the European Conference on Networks and Communications, Athens, GR, Jun. 27-30, 2016, pp. 1-6.
Baumann, C., et al., "On the Verification of System-level Information Flow Properties for Virtualized Execution Platforms", in Journal of Cryptographic Engineering, vol. 9, May 25, 2019, pp. 243-261.
Bershad, B.N., et al., "Extensibility Safety and Performance in the SPIN Operating System", in Proceedings of the 15th ACM Symposium on Operating Systems Principles, Copper Mountain, CO, US, Dec. 3-6, 1995, pp. 1-18.
Biba, K.J., "Integrity Considerations for Secure Computer Systems", Technical Report, The Mitre Corporation, Apr. 1977, pp. 1-68.
Bilzor, M., et al., "Evaluating Security Requirements in a General-Purpose Processor by Combining Assertion Checkers with Code Coverage", in Proc. of the IEEE Intl. Symposium on Hardware-Oriented Security and Trust, San Francisco, CA, US, Jun. 3-4, 2012, pp. 49-54.
Burckhardt, S. and Musuvathi, M., "Effective Program Verification for Relaxed Memory Models", in Proceedings of the 20th International Conference on Computer Aided Verification, Princeton, NJ, US, Jul. 7-14, 2008, pp. 1-14.
Business Wire, "Research and Markets: Global Encryption Software Market (Usage, Vertical and Geography)—Size, Global Trends, Company Profiles, Segmentation and Forecast, 2013-2020", Feb. 11, 2015, pp. 1-3.
Butt, S., et al., "Self-Service Cloud Computing", in Proceedings of the ACM Conference on Computer and Communications Security, Raleigh, NC, US, Oct. 16-18, 2012, pp. 1-78.
Chajed, T., et al., "Verifying Concurrent, Crash-Safe Systems with Perennial", in Proceedings of the 27th ACM Symposium on Operating Systems Principles, Huntsville, ON, Canada, Oct. 27-30, 2019, pp. 1-16.
Chen, H., et al., "Using Crash Hoare Logic for Certifying the FSCQ File System", in Proceedings of the 25th Symposium on Operating Systems Principles, Monterey, CA, US, Oct. 4-7, 2015, pp. 1-20.
Chen, X., et al., "Overshadow: A Virtualization-based Approach to Retrofitting Protection in Commodity Operating Systems", in Proc. of the 13th Intl. Conf. on Architectural Support for Programming Languages and Operating Systems, Seattle, WA, US, Mar. 1-5, 2008, pp. 1-12.
Chhabra, S., et al., "SecureME: A Hardware-software Approach to Full System Security", in Proceedings of the 25th International Conference on Supercomputing, Tucson, AZ, US, May 31- Jun. 4, 2011, pp. 1-12.
Cohen, E., et al., "VCC: A Practical System for Verifying Concurrent C", in Proceedings of the International Conference on Theorem Proving in Higher Order Logics, Munich, DE, Aug. 17-20, 2009, pp. 23-42.
Colp, P., et al., "Breaking Up is Hard to Do: Security and Functionality in a Commodity Hypervisor", in Proceedings of the 23rd ACM Symposium on Operating Systems Principles, Cascais, PT, Oct. 23-26, 2011, pp. 1-14.
Corbet, J., "Kaiser: Hiding the Kernel from User Space", LWN.net, Nov. 15, 2017, pp. 1-11, available at: https://lwn.net/Articles/738975/.

(56) References Cited

OTHER PUBLICATIONS

Costanzo, D., et al., "End-to-End Verification of Information-Flow Security for C and Assembly Programs", in ACM SIGPLAN Notices, vol. 51, No. 6, Jun. 2016, pp. 648-664.

Criswell, J., et al., "Virtual Ghost: Protecting Applications from Hostile Operating Systems", in Proc. of the 19th Intl. Conf. on Architectural Support for Programming Languages and Operating Systems, Salt Lake City, UT, US, Mar. 1-5, 2014, pp. 1-16.

Dall, C. and Nieh, J., "KVM/ARM: Experiences Building the Linux ARM Hypervisor", Technical Report CUCS-010-13, Columbia University, Apr. 2013, pp. 1-19.

Dall, C. and Nieh, J., "KVM/ARM: The Design and Implementation of the Linux ARM Hypervisor", in Proc. of the 19th Intl. Conf. on Architectural Support for Programming Languages and Operating Systems, Salt Lake City, UT, US, Mar. 1-5, 2014, pp. 1-15.

Dall, C., et al., "ARM Virtualization: Performance and Architectural Implications", in Proceedings of the ACM/IEEE 43rd Annual International Symposium on Computer Architecture (ISCA), Seoul, KR, Jun. 18-22, 2016, pp. 1-13.

Dall, C., et al., "Optimizing the Design and Implementation of the Linux ARM Hypervisor", in Proceedings of the 2017 USENIX Annual Technical Conference (USENIX ATC '17), Santa Clara, CA, US, Jul. 12-14, 2017, pp. 1-15.

Danial, A., "cloc: Count Lines of Code", last updated May 1, 2021, pp. 1-63, available at: https://github.com/AlDanial/cloc.

Dautenhahn, N., et al., "Nested Kernel: An Operating System Architecture for Intra-Kernel Privilege Separation", in Proc. of the 20th Intl. Conf. on Architectural Support for Programming Languages and Operating Systems, Istanbul, TR, Mar. 14-18, 2015, pp. 1-16.

Deng, L., et al., "Dancing with Wolves: Towards Practical Event-driven VMM Monitoring", in Proceedings of the 13th ACM SIGPLAN/SIGOPS International Conference on Virtual Execution Environments, Xi'an, CN, Apr. 8-9, 2017, pp. 83-96.

Dong, X., et al., "Shielding Software From Privileged Side-Channel Attacks", in Proceedings of the 27th USENIX Security Symposium, Baltimore, MD, US, Aug. 15-17, 2018, pp. 1-19.

Ernst, G. and Murray, T., "SecCSL: Security Concurrent Separation Logic", in Proceedings of the International Conference on Computer Aided Verification, New York, NY, US, Jul. 15-18, 2019, pp. 208-230.

Ferraiuolo, A., et al., "Komodo: Using Verification to Disentangle Secure-Enclave Hardware from Software", in Proceedings of the 26th Symposium on Operating Systems Principles, Shanghai, CN, Oct. 28, 2017, pp. 1-19.

Flur, S., et al., "Modelling the ARMv8 Architecture, Operationally: Concurrency and ISA", in Proceedings of the 43rd Annual ACM SIGPLAN-SIGACT Symposium on Principles of Programming Languages, St. Petersburg, FL, US, Jan. 20-22, 2016, pp. 1-14.

Focardi, R. and Gorrieri, R., "The Compositional Security Checker: A Tool for the Verification of Information Flow Security Properties", in IEEE Transactions on Software Engineering, vol. 23, No. 9, Sep. 1997, pp. 837-844.

Garfinkel, T., et al., "Terra: A Virtual Machine-based Platform for Trusted Computing", in Proceedings of the 19th ACM Symposium on Operating Systems Principles, Bolton Landing, NY, US, Oct. 19-22, 2003, pp. 1-14.

GNU, "GNU GRUB Manual", May 10, 2021, pp. 1-116, available at: https://www.gnu.org/software/grub/manual/grub/grub.html.

Goguen, J.A. and Meseguer, J., "Unwinding and Inference Control", in Proceedings of the IEEE Symposium on Security and Privacy, Oakland, CA, US, Apr. 29-May 2, 1984, pp. 1-12.

Google Cloud, "Google Cloud Security and Compliance Whitepaper—How Google Protects Your Data", Technical Report, Google LLC, last accessed Aug. 3, 2021, pp. 1-27.

Google LLC, "HTTPS encryption on the web—Google Transparency Report", last accessed Aug. 3, 2021, pp. 1-9, available at: https://transparencyreport.google.com/https/overview.

Graham-Cumming, J. and Sanders, J.W., "On the Refinement of Non-Interference", in Proceedings of the Computer Security Foundations Workshop IV, Franconia, NH, US, Jun. 18-20, 1991, pp. 1-8.

Gu, R., et al., "Certified Concurrent Abstraction Layers", in Proc. of the 39th ACM SIGPLAN Conf. on Programming Language Design and Implementation, Philadelphia, PA, US, Jun. 18-22, 2018, pp. 1-16.

Gu, R., et al., "CertiKOS: An Extensible Architecture for Building Certified Concurrent OS Kernels", in Proceedings of the 12th USENIX Symposium on Operating Systems Design and Implementation, Savannah, GA, US, Nov. 2-4, 2016, pp. 1-19.

Gu, R., et al., "Deep Specifications and Certified Abstraction Layers", in ACM SIGPLAN Notices, vol. 50, No. 1, Jan. 2015, pp. 595-608.

Hajnoczi, S., "An Updated Overview of the QEMU Storage Stack", Presentation, IBM Linux Technology Center, Jun. 2011, pp. 1-26.

Halderman, J.A., et al., "Lest We Remember: Cold Boot Attacks on Encryption Keys", in Proceedings of the 17th USENIX Security Symposium, San Jose, CA, US, Jul. 28-Aug. 1, 2008, pp. 1-16.

Hawblitzel, C., et al., "Ironclad Apps: End-to-End Security via Automated Full-System Verification", in Proceedings of the 11th USENIX Symposium on Operating Systems Design and Implementation, Broomfield, CO, US, Oct. 6-8, 2014, pp. 1-18.

Hawblitzel, C., et al., "IronFleet: Proving Practical Distributed Systems Correct", in Proceedings of the 25th Symposium on Operating Systems Principles, Monterey, CA, US, Oct. 4-7, 2015, pp. 1-17.

Heiser, G. and Leslie, B., "The OKL4 Microvisor: Convergence Point of Microkernels and Hypervisors", in Proceedings of the 1st ACM Asia-Pacific Workshop on Workshop on Systems, New Delhi, IN, Aug. 30, 2010, pp. 1-5.

Hicks, M., et al., "Overcoming an Untrusted Computing Base: Detecting and Removing Malicious Hardware Automatically", in ;login: Magazine, vol. 35, No. 6, Dec. 2010, pp. 31-41.

Hofmann, O.S., et al., "InkTag: Secure Applications on an Untrusted Operating System", in Proc. of the 18th Intl. Conf. on Architectural Support for Programming Languages and Operating Systems, Houston, TX, US, Mar. 16-20, 2013, pp. 1-37.

Hua, Z., et al., "vTZ: Virtualizing ARM Trustzone", in Proceedings of the 26th USENIX Security Symposium, Vancouver, BC, Canada, Aug. 16-18, 2017, pp. 1-17.

Intel Corporation, "Intel Architecture Memory Encryption Technologies Specification", Technical Report, 336907-001US, Dec. 2017, pp. 1-30.

Intel Corporation, "Intel Software Guard Extensions Programming Reference", Technical Report, 329298-002US, Oct. 2014, pp. 1-186.

International Organization for Standardization and International Electrotechnical Commission, "Information Technology—Trusted Platform Module Library—Part 1: Architecture", Technical Report, ISO/IEC 11889-1:2015, Apr. 1, 2016, pp. 1-278.

Irazoqui, G., et al., "S$A: A Shared Cache Attack That Works across Cores and Defies VM Sandboxing—and Its Application to AES", in Proceedings of the IEEE Symposium on Security and Privacy, San Jose, CA, US, May 17-21, 2015, pp. 1-14.

Jang, D., et al., "Establishing Browser Security Guarantees through Formal Shim Verification", in Proceedings of the 21st USENIX Security Symposium, Bellevue, WA, US, Aug. 8-10, 2012, pp. 1-16.

Jin, S., et al., "Architectural Support for Secure Virtualization Under a Vulnerable Hypervisor", in Proc. of the 44th Annual IEEE/ACM Intl. Symposium on Microarchitecture, Porto Alegre, BR, Dec. 3-7, 2011, pp. 1-12.

Jones, C.B., "Tentative Steps Toward a Development Method for Interfering Programs", in ACM Transactions on Programming Languages and Systems, vol. 5, No. 4, Oct. 1983, pp. 596-619.

Jones, R., "Netperf", last accessed Jul. 27, 2021, pp. 1-2, available at: https://github.com/HewlettPackard/netperf.

Karbyshev, A., et al., "Compositional Non-Interference for Concurrent Programs via Separation and Framing", in Proc. of the 7th Intl. Conf. on Theory and Practice of Software, Thessaloniki, GR, Apr. 14-20, 2018, pp. 53-78.

(56) References Cited

OTHER PUBLICATIONS

Keller, E., et al., "NoHype: Virtualized Cloud Infrastructure Without the Virtualization", in Proceedings of the 37th Annual International Symposium on Computer Architecture, Saint-Malo, FR, Jun. 19-23, 2010, pp. 1-12.

Keller, R.M., "Formal Verification of Parallel Programs", in Communications of the ACM, vol. 19, No. 7, Jul. 1976, pp. 371-384.

Kemerlis, V.P., et al., "kGuard: Lightweight Kernel Protection against Return-to-User Attacks", in Proceedings of the 21st USENIX Security Symposium, Bellevue, WA, US, Aug. 8-10, 2012, pp. 1-16.

Kivity, A., et al., "KVM: The Linux Virtual Machine Monitor", in Proceedings of the Ottawa Linux Symposium, Ottawa, ON, Canada, Jun. 27-30, 2007, pp. 225-230.

Klein, G., et al., "Formally Verified Software in the Real World", in Communications of the ACM, vol. 61, No. 10, Oct. 2018, pp. 68-77.

Klein, G., et al., "seL4: Formal Verification of an OS Kernel", in Proceedings of the 22nd ACM Symposium on Operating Systems Principles, Big Sky, MT, US, Oct. 11-14, 2009, pp. 1-14.

Kokke, "Kokke/Tiny AES in C", last accessed Jul. 27, 2021, pp. 1-4, available at: https://github.com/kokke/tiny-AES-c.

Kuperman, Y., et al., "Paravirtual Remote I/O", in Proc. of the 21st Intl. Conf. on Architectural Support for Programming Languages and Operating Systems, Atlanta, GA, US, Apr. 2-6, 2016, pp. 1-17.

KVM Contributors, "CPU Performance", KVM, last accessed Jul. 27, 2021, pp. 1-2, available at: https://www.linux-kvm.org/page/Tuning_KVM.

KVM Contributors, "Kernel Samepage Merging", KVM, last accessed Jul. 27, 2021, pp. 1-2, available at: https://www.linux-kvm.org/page/KSM.

KVM Contributors, "KVM Unit Tests", KVM, last accessed Jul. 27, 2021, pp. 1-6, available at: https://www.linux-kvm.org/page/KVM-unit-tests.

Lam, L.C. and Chiueh, T.C., "A General Dynamic Information Flow Tracking Framework for Security Applications", in Proceedings of the 22nd Annual Computer Security Applications Conference, Miami Beach, FL, US, Dec. 11-15, 2006, pp. 436-472.

Landau, S., "Making Sense from Snowden: What's Significant in the NSA Surveillance Revelations", in IEEE Security & Privacy, vol. 11, No. 4, Jul.-Aug. 2013, pp. 54-63.

Leinenbach, D. and Santen, T., "Verifying the Microsoft Hyper-V Hypervisor with VCC", in Proceedings of the International Symposium on Formal Methods, Eindhoven, NL, Nov. 2-6, 2009, pp. 806-809.

Leroy, X., "The CompCert C Verified Compiler: Documentation and User's Manual", Technical Report, Version 3.8, College of France and Inria, Nov. 16, 2020, pp. 1-80.

Let's Encrypt, "Let's Encrypt Stats", last accessed Apr. 14, 2018, pp. 1-2, available at: https://web.archive.org/web/20180414152054/https://letsencrypt.org/stats/.

Li, S.W., et al., "Protecting Cloud Virtual Machines from Hypervisor and Host Operating System Exploits", in Proceedings of the 28th USENIX Security Symposium, Santa Clara, CA, US, Aug. 14-16, 2019, pp. 1-19.

Liang, H., et al., "A Rely-Guarantee-Based Simulation for Verifying Concurrent Program Transformations", in Proc. of the 39th Annual ACM SIGPLAN-SIGACT Symposium on Principles of Programming Languages, Philadelphia, PA, US, Jan. 25-27, 2012, pp. 1-14.

Liedtke, J., "On Micro-Kernel Construction", in Proceedings of the 15th ACM Symposium on Operating Systems Principles, Copper Mountain, CO, US, Dec. 3-6, 1995, pp. 1-16.

Lim, J., et al., "NEVE: Nested Virtualization Extensions for ARM", in Proceedings of the 26th Symposium on Operating Systems Principles, Shanghai, CN, Oct. 28, 2017, pp. 1-17.

Liu, F., et al., "Last-Level Cache Side-Channel Attacks are Practical", in Proceedings of the IEEE Symposium on Security and Privacy, San Jose, CA, US, May 17-21, 2015, pp. 1-18.

Liu, Y., et al., "Thwarting Memory Disclosure with Efficient Hypervisor-enforced Intra-domain Isolation", in Proc. of the 22nd ACM SIGSAC Conf. on Computer and Comms. Security, Denver, CO, US, Oct. 12-16, 2015, pp. 1-13.

Lynch, N. and Vaandrager, F., "Forward and Backward Simulations", in Information and Computation, vol. 121, No. 2, Sep. 1995, pp. 214-233.

McCune, J.M., et al., "TrustVisor: Efficient TCB Reduction and Attestation", in Proceedings of the IEEE Symposium on Security and Privacy, Oakland, CA, US, May 16-19, 2010, pp. 1-17.

Microsoft Azure, "Key Vault", last accessed Jul. 27, 2021, pp. 1-7, available at: https://azure.microsoft.com/en-in/services/key-vault/.

Microsoft, "BitLocker", Jan. 26, 2018, pp. 1-6, available at: https://docs.microsoft.com/en-us/windows/security/information-protection/bitlocker/bitlocker-overview.

Microsoft, "Hyper-V Technology Overview", Nov. 29, 2016, pp. 1-5, available at: https://docs.microsoft.com/en-us/windows-server/virtualization/hyper-v/hyper-v-technology-overview.

Mosberger, D., "Memory Consistency Models", in ACM SIGOPS Operating Systems Review, vol. 27, No. 1, Jan. 1993, pp. 18-26.

Murray, D.G., et al., "Improving Xen Security Through Disaggregation", in Proceedings of the 4th ACM SIGPLAN/SIGOPS International Conference on Virtual Execution Environments, Seattle, WA, US, Mar. 5-7, 2008, pp. 1-10.

Murray, T., et al., "Compositional Verification and Refinement of Concurrent Value-Dependent Noninterference", in Proceedings of the IEEE 29th Computer Security Foundations Symposium, Lisbon, PT, Jun. 27-Jul. 1, 2016, pp. 1-15.

Murray, T., et al., "Covern: A Logic for Compositional Verification of Information Flow Control", in Proceedings of the IEEE European Symposium on Security and Privacy, London, UK, Apr. 24-26, 2018, pp. 1-15.

Murray, T., et al., "Noninterference for Operating System Kernels", in Proceedings of the International Conference on Certified Programs and Proofs, Kyoto, JP, Dec. 13-15, 2012, pp. 1-16.

Murray, T., et al., "seL4: From General Purpose to a Proof of Information Flow Enforcement", in Proceedings of the IEEE Symposium on Security and Privacy, Berkeley, CA, US, May 19-22, 2013, pp. 1-15.

Nelson, L., et al., "Scaling Symbolic Evaluation for Automated Verification of Systems Code with Serval", in Proceedings of the 27th ACM Symposium on Operating Systems Principles, Huntsville, ON, Canada, Oct. 27-30, 2019, pp. 1-18.

Nguyen, A., et al., "Delusional Boot: Securing Hypervisors Without Massive Re-engineering", in Proceedings of the 7th ACM European Conference on Computer Systems, Bern, CH, Apr. 10-13, 2012, pp. 1-14.

Olarte, C. and Valencia, F.D., "Universal Concurrent Constraint Programing: Symbolic Semantics and Applications to Security", in Proceedings of the ACM Symposium on Applied Computing, Fortaleza, Ceara, BR, Mar. 16-20, 2008, pp. 145-150.

OP-TEE, "Open Portable Trusted Execution Environment", last accessed Jul. 27, 2021, pp. 1, available at: https://www.op-tee.org/.

Owens, S., et al., "A Better x86 Memory Model: x86-TSO", in Proceedings of the 22nd International Conference on Theorem Proving in Higher Order Logics, Munich, DE, Aug. 17-20, 2009, pp. 1-17.

Peters, O., et al., "orlp / Ed25519", last accessed Jul. 27, 2021, pp. 1-5, available at: https://github.com/orlp/ed25519.

Pulte, C., et al., "Promising-ARM/RISC-V: A Simpler and Faster Operational Concurrency Model", in Proceedings of the 40th ACM SIGPLAN Conference on Programming Language Design and Implementation, Phoenix, AZ, US, Jun. 22-26, 2019, pp. 1-25.

Pulte, C., et al., "Simplifying ARM Concurrency: Multicopy-Atomic Axiomatic and Operational Models for ARMv8", in Proceedings of the ACM on Programming Languages, vol. 2, No. POPL, Jan. 2018, pp. 1-29.

Qin, F., et al., "LIFT: A Low-Overhead Practical Information Flow Tracking System for Detecting Security Attacks", in Proceedings of the 39th Annual IEEE/ACM International Symposium on Microarchitecture, Orlando, FL, US, Dec. 9-13, 2006, pp. 135-148.

Reuters, "Cloud Companies Consider Intel Rivals After the Discovery of Microchip Security Flaws", CNBC, last updated Jan. 10, 2018, pp. 1-5, available at: https://www.cnbc.com/2018/01/10/cloud-companies-consider-intel-rivals-after-security-flaws-found.html.

Riley, R., et al., "Guest-Transparent Prevention of Kernel Rootkits with VMM-Based Memory Shadowing", in Proc. of the 11th Intl.

(56) References Cited

OTHER PUBLICATIONS

Symposium on Recent Advances in Intrusion Detection, Cambridge, MA, US, Sep. 15-17, 2008, pp. 1-21.
Ristenpart, T., et al., "Hey, You, Get Off of My Cloud: Exploring Information Leakage in Third-Party Compute Clouds", in Proc. of the 16th ACM Conf. on Computer and Comms. Security, Chicago, IL, US, Nov. 9-13, 2009, pp. 1-14.
Russell, R., "Virtio: Towards a De-Facto Standard for Virtual I/O Devices", in ACM SIGOPS Operating Systems Review, vol. 42, No. 5, Jul. 2008, pp. 95-103.
Russell, R., et al., "Hackbench", Jan. 4, 2008, pp. 1-6, available at: https://people.redhat.com/mingo/cfs-scheduler/tools/hackbench.c.
Sabelfeld, A. and Myers, A.C., "A Model for Delimited Information Release", in Proceedings of the International Symposium on Software Security, Tokyo, JP, Nov. 4-6, 2003, pp. 1-18.
Saltzer, J.H., et al., "End-to-End Arguments in System Design", in ACM Transactions on Computer Systems, vol. 2, No. 4, Nov. 1984, pp. 277-288.
Sanan, D., et al., "CSimpl: A Rely-Guarantee-Based Framework for Verifying Concurrent Programs", in Proceedings of the International Conference on Tools and Algorithms for the Construction and Analysis of Systems, Uppsala, SE, Apr. 24-28, 2017, pp. 481-498.
Schoepe, D., et al., "Veronica: Expressive and Precise Concurrent Information Flow Security (Extended Version with Technical Appendices)", Technical Report, arXiv:2001.11142, Cornell Univerity, Jan. 30, 2020, pp. 1-18.
Seshadri, A., et al., "SecVisor: A Tiny Hypervisor to Provide Lifetime Kernel Code Integrity for Commodity Oses", in Proceedings of 21st ACM SIGOPS Symposium on Operating Systems Principles, Stevenson, WA, US, Oct. 14-17, 2007, pp. 1-17.
Shi, L., et al., "Deconstructing Xen", in Proceedings of the 24th Annual Network and Distributed System Security Symposium, San Diego, CA, US, Feb. 26-Mar. 1, 2017, pp. 1-15.
Shih, M.W., et al., "S-NFV: Securing NFV States by Using SGX", in Proc. of the ACM Intl. Workshop on Security in Software Defined Networks & Network Function Virtualization, New Orleans, LA, US, Mar. 11, 2016, pp. 1-4.
Shinagawa, T., et al., "BitVisor: A Thin Hypervisor for Enforcing I/O Device Security", in Proceedings of the ACM SIGPLAN/SIGOPS International Conference on Virtual Execution Environments, Washington, DC, US, Mar. 11-13, 2009, pp. 1-12.
Siemens, "Jailhouse", last accessed Jul. 27, 2021, pp. 1-10, available at: https://github.com/siemens/jailhouse.
Sigurbjarnarson, H., et al., "Nickel: A Framework for Design and Verification of Information Flow Control Systems", in Proc. of the 13th USENIX Symposium on Operating Systems Design and Implementation (OSDI '18), Carlsbad, CA, US, Oct. 8-10, 2018, pp. 1-20.
Stefan, D., et al., "Addressing Covert Termination and Timing Channels in Concurrent Information Flow Systems", in ACM SIGPLAN Notices, vol. 47, No. 9, Sep. 2012, pp. 201-214.
Steinberg, U. and Kauer, B., "NOVA: A Microhypervisor-based Secure Virtualization Architecture", in Proceedings of the 5th European Conference on Computer Systems, Paris, FR, Apr. 13-16, 2010, pp. 1-14.
Stewin, P. and Bystrov, I., "Understanding DMA Malware", in Proc. of the 9th Intl. Conf. on Detection of Intrusions and Malware, and Vulnerability Assessment, Heraklion, Crete, GR, Jul. 26-27, 2012, pp. 1-21.
Strackx, R. and Piessens, F., "Fides: Selectively Hardening Software Application Components Against Kernel-level or Process-level Malware", in Proc. of the ACM Conf. on Computer and Comms. Security, Raleigh, NC, US, Oct. 16-18, 2012, pp. 1-12.
Suse, "Performance Implications of Cache Modes", Jul. 30, 2021, pp. 1-5, available at: https://documentation.suse.com/sles/11-SP4/html/SLES-all/cha-qemu-cachemodes.html.
Szefer, J. and Lee, R.B., "Architectural Support for Hypervisor-secure Virtualization", in Proc. of the 17th Intl. Conf. on Architectural Support for Programming Languages and Operating Systems, London, UK, Mar. 3-7, 2012, pp. 1-13.
Ta-Min, R., et al., "Splitting Interfaces: Making Trust Between Applications and Operating Systems Configurable", in Proceedings of the 7th Symposium on Operating Systems Design and Implementation, Seattle, WA, US, Nov. 6-8, 2006, pp. 279-292.
The Apache Software Foundation, "Ab—Apache HTTP Server Benchmarking Tool", last accessed Jul. 28, 2021, pp. 1-4, available at: http://httpd.apache.org/docs/2.4/programs/ab.html.
The Coq Development Team, "The Coq Proof Assistant", last accessed Aug. 2, 2021, pp. 1, available at: https://coq.inria.fr/.
Trippel, C.J., "Concurrency and Security Verification in Heterogeneous Parallel Systems", Technical Report, Princeton University, Nov. 2019, pp. 1-88.
Vasudevan, A., et al., "Design, Implementation and Verification of an extensible and Modular Hypervisor Framework", in Proceedings of the IEEE Symposium on Security and Privacy, Berkeley, CA, US, May 19-22, 2013, pp. 1-15.
Vasudevan, A., et al., "uberSpark: Enforcing Verifiable Object Abstractions for Automated Compositional Security Analysis of a Hypervisor", in Proceedings of the 25th USENIX Security Symposium, Austin, TX, US, Aug. 10-12, 2016, pp. 1-19.
Vaughan-Nichols, S.J., "Hypervisors: The Cloud's Potential Security Achilles Heel", ZDNet, Mar. 29, 2014, pp. 1-16.
Von Tessin, M., "The Clustered Multikernel: An Approach to Formal Verification of Multiprocessor OS Kernels", in Proceedings of the 2nd Workshop on Systems for Future Multi-core Architectures, Bern, CH, Apr. 2012, pp. 1-6.
Waldspurger, C.A., "Memory Resource Management in VMware ESX Server", in Proceedings of the 5th Symposium on Operating Systems Design and Implementation, Boston, MA, US, Dec. 9-11, 2002, pp. 1-15.
Wang, X., et al., "SecPod: A Framework for Virtualization-based Security Systems", in Proceedings of the USENIX Annual Technical Conference (USENIC ATC '15), Santa Clara, CA, US, Jul. 8-10, 2015, pp. 1-15.
Wang, Z. and Jiang, X., "HyperSafe: A Lightweight Approach to Provide Lifetime Hypervisor Control-Flow Integrity", in Proceedings of the IEEE Symposium on Security and Privacy, Oakland, CA, US, May 16-19, 2010, pp. 1-16.
Wang, Z., et al., "Countering Kernel Rootkits with Lightweight Hook Protection", in Proceedings of the 16th ACM Conference on Computer and Communications Security, Chicago, IL, US, Nov. 9-13, 2009, pp. 1-10.
Wang, Z., et al., "Isolating Commodity Hosted Hypervisors with HyperLock", in Proceedings of the 7th ACM European Conference on Computer Systems, Bern, CH, Apr. 10-13, 2012, pp. 1-14.
Williams, C., "Microsoft: Can't Wait for ARM to Power MOST of Our Cloud Data Centers! Take that, Intel! Ha! Ha!", The Register, Mar. 9, 2017, pp. 1-11, available at: https://www.theregister.com/2017/03/09/microsoft_arm_server_followup/.
Wu, C., et al., "Taming Hosted Hypervisors with (Mostly) Deprivileged Execution", in Proceedings of the 20th Annual Network and Distributed System Security Symposium, San Diego, Ca, US, Feb. 24-27, 2013, pp. 1-15.
Wu, Y., et al., "Comprehensive VM Protection Against Untrusted Hypervisor Through Retrofitted AMD Memory Encryption", in Proc. of the IEEE Intl. Symposium on High Performance Computer Architecture, Vienna, AT, Feb. 24-28, 2018, pp. 1-13.
Xia, Y., et al., "Architecture Support for Guest-Transparent VM Protection from Untrusted Hypervisor and Physical Attacks", in Proc. of the IEEE 19th Intl. Symposium on High Performance Computer Architecture, Shenzhen, CN, Feb. 23-27, 2013, pp. 1-12.
Yang, J. and Shin, K.G., "Using Hypervisor to Provide Data Secrecy for User Applications on a Per-page Basis", in Proc. of the 4th ACM SIGPLAN/SIGOPS Intl. Conf. on Virtual Execution Environments, Seattle, WA, US, Mar. 5-7, 2008, pp. 1-10.
Zhang, F., et al., "CloudVisor: Retrofitting Protection of Virtual Machines in Multi-tenant Cloud with Nested Virtualization", in Proceedings of the 23rd ACM Symposium on Operating Systems Principles, Cascais, PT, Oct. 23-26, 2011, pp. 203-216.
Zhang, Y., et al., "Cross-Tenant Side-Channel Attacks in PaaS Clouds", in Proceedings of the ACM SIGSAC Conference on Computer and Communications Security, Scottsdale, AZ, US, Nov. 3-7, 2014, pp. 1-14.

(56) References Cited

OTHER PUBLICATIONS

Zhang, Y., et al., "Cross-VM Side Channels and Their Use to Extract Private Keys", in Proceedings of the ACM Conference on Computer and Communications Security, Raleigh, NC, US, Oct. 16-18, 2012, pp. 1-12.
Zhou, Z., et al., "Dancing with Giants: Wimpy Kernels for On-Demand Isolated I/O", in Proceedings of the IEEE Symposium on Security and Privacy, Berkeley, CA, US, May 18-21, 2014, pp. 1-16.
Zhu, M., et al., "HA-VMSI: A Lightweight Virtual Machine Isolation Approach with Commodity Hardware for ARM", in Proc. of the 13th ACM SIGPLAN/SIGOPS Intl. Conf. on Virtual Execution Environments, Xi'an, CN, Apr. 8-9, 2017, pp. 1-15.
Zinzindohoue, J.K., et al., "HACL*: A Verified Modern Cryptographic Library", in Proc. of the ACM SIGSAC Conf. on Computer and Comms. Security, Dallas, TX, US, Oct. 30-Nov. 3, 2017, pp. 1-18.
Zou, M., et al., "Using Concurrent Relational Logic with Helpers for Verifying the AtomFS File System", in Proceedings of the 27th ACM Symposium on Operating Systems Principles, Huntsville, ON, Canada, Oct. 27-30, 2019, pp. 1-16.
Dolan, S., et al., "Bounding Data Races in Space and Time", in Proceedings of the 39th ACM SIGPLAN Conference on Programming Language Design and Implementation, Philadelphia, PA, US, Jun. 18-22, 2018, pp. 1-19.
Gu, R., et al., "CertiKOS: An Extensible Architecture for Building Certified Concurrent OS Kernels", in Proceedings of the 12th Symposium on Operating Systems Design and Implementation, Savannah, GA, US, Nov. 2-4, 2016, pp. 653-669.
Hajdarbegovic, N., "ARM Servers: Mobile CPU Architecture For Datacentres?", Toptal, last accessed Aug. 19, 2021, pp. 1-23, available at: https://www.toptal.com/back-end/arm-servers-armv8-for-datacentres.
Lamport, L., "How to Make a Multiprocessor Computer That Correctly Executes Multiprocess Programs", in IEEE Transactions on Computers, vol. C-28, No. 9, Sep. 1979, pp. 690-691.
Sigurbjarnarson, H., et al., "Push-Button Verification of File Systems via Crash Refinement", in Proceedings of the 12th USENIX Symposium on Operating Systems Design and Implementation, Savannah, GA, US, Nov. 2-4, 2016, pp. 1-17.
Wagner, I. and Bertacco, V., "MCjammer: Adaptive Verification for Multi-core Designs", in Proceedings of the Conference on Design, Automation and Test in Europe, Munich, DE, Mar. 10-14, 2008, pp. 1-6.
Adve, S.V., and Gharachorloo, K., "Shared Memory Consistency Models: A Tutorial", in Computer, vol. 29, No. 12, Dec. 1996, pp. 66-76.
Hsu, T.C.H., "Memory Subsystems for Security, Consistency, and Scalability", Dissertation, Purdue University, 2018, pp. 1-135.
Office Action dated Aug. 17, 2023 in U.S. Appl. No. 17/376,120, pp. 2-56.
Park, S., and Dile, D.L., "An Executable Specification and Verifier for Relaxed Memory Order", in IEEE Transactions on Computers, vol. 48, No. 2, Feb. 1999, pp. 227-235.
7-cpu.com, "Applied Micro X-gene", 7-cpu.com, last accessed Jan. 31, 2024, pp. 1-2, available at: https://www.7-cpu.com/cpu/X-Gene.html.
Alglave, J., et al., "Frightening Small Children and Disconcerting Grown-ups: Concurrency in the Linux Kernel", in Proceedings of the Twenty-Third International Conference on Architectural Support for Programming Languages and Operating Systems, Williamsburg, VA, US, Mar. 24-28, 2018, pp. 1-14.
Alglave, J., et al., "Herding Cats: Modelling, Simulation, Testing, and Data Mining for Weak Memory", in ACM Transactions on Programming Languages and Systems (TOPLAS), vol. 36, No. 2, Jul. 1, 2014, pp. 1-74.
Alglave, J., et al., "The Semantics of Power and ARM Multiprocessor Machine Code", in Proceedings of the 4th Workshop on Declarative Aspects of Multicore Programming, Savannah, GA, US, Jan. 20, 2009, pp. 1-12.
Asanovic, K., et al., "The RISC-V Instruction Set Manual, vol. I: User-level ISA, Document Version Dec. 13, 2019", RISC-V Foundation, Dec. 2019, pp. 1-238.
Batty, M., et al., "Mathematizing C++ Concurrency", in Proceedings of the 38th Annual ACM SIGPLAN-SIGACT Symposium on Principles of Programming Languages, Austin, TX, US, Jan. 26-28, 2011, pp. 1-12.
Blazy, S., et al., "Mechanized Semantics for the Clight Subset of the C Language", in Journal of Automated Reasoning, vol. 43, No. 3, 2009, pp. 1-26.
Boudol, G., et al., "Relaxed Memory Models: an Operational Approach", in ACM SIGPLAN Notices, vol. 44, No. 1, 2009, pp. 1-12.
Cooper, B. F., et al., "Benchmarking Cloud Serving Systems with YCSB", in Proceedings of the 1st ACM Symposium on Cloud Computing, Indianapolis, IN, US, Jun. 10-11, 2010, pp. 143-154.
Deacon, W., et al., "The Armv8 Application Level Memory Model", Arm Ltd., 2016, pp. 1-2, available at: http://diy.inria.fr/www/?record=aarch64.
Donenfeld, J. A., "Wireguard: Next Generation Kernel Network Tunnel", in Proceedings of the 24th Annual Network and Distributed System Security Symposium, San Diego, CA, US, Feb. 26-Mar. 1, 2017, pp. 1-12.
Gray, K. E., et al., "An Integrated Concurrency and Core-ISA Architectural Envelope Definition, and Test Oracle, for IBM Power Multiprocessors", in Proceedings of the 48th International Symposium on MicroArchitecture, Waikiki, HI, Dec. 5-9, 2015, pp. 635-646.
Jiang, H., et al., "Towards Certified Separate Compilation for Concurrent Programs", in Proceedings of the 40th ACM SIGPLAN Conference on Programming Language Design and Implementation, Phoenix, AZ, US, Jun. 22-26, 2019, pp. 111-125.
Jin, X., et al., "FTXen: Making Hypervisor Resilient to Hardware Faults on Relaxed Cores", in Proceedings of the 2015 IEEE 21st International Symposium on High Performance Computer Architecture (HPCA), Burlingame, CA, US, Feb. 7-11, 2015, pp. 451-462.
Kang, J., et al., "A Promising Semantics for Relaxed Memory Concurrency", in Proceedings of the 44th ACM SIGPLAN Symposium on Principles of Programming Languages, Paris, FR, Jan. 18-20, 2017, pp. 175-189.
Klein, G., et al., "Comprehensive Formal Verification of an OS Microkernel", in ACM Transactions on Computer Systems (TOCS), vol. 32, No. 1, 2014, pp. 1-70.
KVM Contributors, "Tuning KVM", KVM, last accessed Jan. 31, 2024, pp. 1-2, available at: https://www.linux-kvm.org/page/Tuning_KVM.
Lahav, O., et al., "Decidable Verification Under a Causally Consistent Shared Memory" in Proceedings of the 41st ACM SIGPLAN Conference on Programming Language Design and Implementation, London, UK, Jun. 15-20, 2020, pp. 211-226.
Lahav, O., et al., "Repairing Sequential Consistency in C/C++11", in Proceedings of the 38th ACM SIGPLAN Conference on Programming Language Design and Implementation, Barcelona, ES, Jun. 18-23, 2017, pp. 618-632.
Li, S.W., et al., "A Secure and Formally Verified Linux KVM Hypervisor", in Proceedings of the 2021 IEEE Symposium on Security and Privacy (SP), San Francisco, CA, US, May 24-27, 2021, pp. 1782-1799.
Liu, F., et al., "Dynamic Synthesis for Relaxed Memory Models", in ACM SIGPLAN Notices, vol. 47, No. 6, Jun. 11, 2012, pp. 429-439.
Lorch, J. R., et al., "Armada: Low-Effort Verification of High-Performance Concurrent Programs", in Proceedings of the 41st ACM SIGPLAN Conference on Programming Language Design and Implementation, London, UK, Jun. 15-20, 2020, pp. 197-210.
Mador-Haim, S., et al., "An Axiomatic Memory Model for POWER Multiprocessors", in Proceedings of Computer Aided Verification: 24th International Conference, CAV, Berkeley, CA, USA, Jul. 7-13, 2012, pp. 495-512.
Margalit, R., et al., "Verifying Observational Robustness Against a c11-style Memory Model", in Proceedings of the ACM on Programming Languages, vol. 5, No. POPL, Jan. 2021, pp. 1-33.

(56) References Cited

OTHER PUBLICATIONS

Notice of Allowance dated Jan. 31, 2024 in U.S. Appl. No. 17/376,120, pp. 1-17.
Podkopaev, A., et al., "Bridging the Gap Between Programming Languages and Hardware Weak Memory Models", in Proceedings of the ACM on Programming Languages, vol. 3, No. 69, POPL, Jan. 2019, pp. 1-31.
Romanescu, B. F., et al., "Specifying and Dynamically Verifying Address Translation-aware Memory Consistency", in ACM Sigplan Notices, vol. 45, No. 3, 2010, pp. 323-334.
Sarkar, S., et al., "Synchronising c/c++ and Power", in Proceedings of the 33rd ACM SIGPLAN Conference on Programming Language Design and Implementation, Beijing, CN, Jun. 11-16, 2012, pp. 311-322.
Sarkar, S., et al., "Understanding POWER Multiprocessors", ACM SIGPLAN Notices, vol. 46, No. 6, Jun. 2011, pp. 175-186.
Ševčík, J., et al., "CompCertTSO: A Verified Compiler for Relaxed-Memory Concurrency", in Journal of the ACM, vol. 60, No. 3, Jun. 1, 2013, pp. 1-49.
Sevcik, J., et al., "Relaxed-memory Concurrency and Verified Compilation", in Proceedings of the 38th annual ACM SIGPLAN-SIGACT Symposium on Principles of Programming Languages, Austin, TX, US, Jan. 26-28, 2011, pp. 43-54.
Sewell P., et al., "x86-TSO: A Rigorous and Usable Programmer's Model for x86 Multiprocessors", in Communications of the ACM, vol. 53, No. 7, Jul. 2010, pp. 89-97.
Trusted Computing Group, "Trusted Platform Module", last accessed Jan. 31, 2024, pp. 1-2, available at: https://www.trustedcomputinggroup.org/.
Zdancewic, S., et al., "Observational Determinism for Concurrent Program Security", in Proceedings of the 16th IEEE Computer Security Foundations Workshop, Pacific Grove, CA, USA, Jun. 2003, pp. 29-43.
Abts, D., et al., "So Many States, So Little Time: Verifying Memory Coherence in the Cray X1", in Proceedings of International Parallel and Distributed Processing Symposium, Nice, FR, Apr. 22-26, 2003, pp. 1-10.
Chen, K., et al., "Runtime Validation of Memory Ordering Using Constraint Graph Checking", in Proceedings of 2008 IEEE 14th International Symposium on High Performance Computer Architecture, Salt Lake City, UT, US, Feb. 16-20, 2008, pp. 415-426.
Microv, "A Secure and Formally Verified Linux KVM Hypervisor", last accessed Mar. 5, 2024, pp. 1-13, available at: https://sites.google.com/view/microv.
Notice of Allowance dated May 3, 2024 in U.S. Appl. No. 17/376,120, pp. 1-24.
U.S. Appl. No. 62/867,808, filed Jun. 27, 2019, pp. 1-20.
U.S. Appl. No. 63/051,710, filed Jul. 14, 2020, pp. 1-29.
U.S. Appl. No. 63/190,674, filed May 19, 2021, pp. 1-17.
Zhang, H., et al., "ILA-MCM: Integrating Memory Consistency Models with Instruction-Level Abstractions for Heterogeneous System-on-Chip Verification", in Proceedings of 2018 Formal Methods in Computer Aided Design, Austin, TX, Oct. 30-Nov. 2, 2018, pp. 1-10.

\* cited by examiner

SYSTEMS, METHODS, AND MEDIA FOR TRUSTED HYPERVISORS

CROSS-REFERENCE TO RELATED APPLICATION

This application claims the benefit of U.S. Provisional Patent Application No. 62/867,808, filed Jun. 27, 2019, which is hereby incorporated by reference herein in its entirety.

STATEMENT REGARDING GOVERNMENT FUNDED RESEARCH

This invention was made with government support under CNS-1717801 and CNS-1563555 awarded by the National Science Foundation. The government has certain rights in the invention.

BACKGROUND

The availability of cost-effective, commodity cloud providers has pushed increasing numbers of companies and users to move their data and computation offsite into virtual machines (VMs) running on hosts in the cloud. Hypervisors running on such hosts provide virtual machine (VM) abstraction and have control of the hardware resources. Modern hypervisors are often integrated with a host operating system (OS) kernel to leverage existing kernel functionality to simplify their implementation and maintenance effort. For example, the KVM hypervisor (available from www.linux-kvm.org) is integrated with Linux, and the Hyper-V hypervisor (available from Microsoft Corporation of Redmond, Washington) is integrated with Windows. The result is a huge potential attack surface with access to VM data in CPU registers, memory, I/O data, and boot images. The surge in outsourcing of computational resources to the cloud and away from privately-owned data centers further exacerbates this security risk of relying on the trustworthiness of complex and potentially vulnerable hypervisors and host OS infrastructures. Attackers that successfully exploit hypervisor vulnerabilities can gain unfettered access to VM data, and compromise the privacy and integrity of all VMs—an undesirable outcome for both cloud providers and users.

Accordingly, new hypervisor designs are desirable.

SUMMARY

In accordance with some embodiments, systems, methods, and media for trusted hypervisors are provided. In some embodiments, systems are provided, the systems comprising: a memory; and a hardware processor coupled to the memory and configured to: execute a hypervisor having a first portion and a second portion, wherein the first portion of the hypervisor executes at a first exception level that allows the first portion to access data of a virtual machine in the hardware processor and the memory, and wherein the second portion of the hypervisor executes at a second exception level that prevents the second portion from accessing the data of the virtual machine in the hardware processor and the memory.

In some embodiments, methods are provided, the methods comprising: executing a first portion of a hypervisor at a first exception level that allows the first portion to access data of a virtual machine in a hardware processor and memory; and executing a second portion of a hypervisor at a second exception level that prevents the second portion from accessing the data of the virtual machine in the hardware processor and the memory.

In some embodiments, non-transitory computer-readable media containing computer executable instructions that, when executed by a processor, cause the processor to perform a method are provided, the method comprising: comprising: executing a first portion of a hypervisor at a first exception level that allows the first portion to access data of a virtual machine in a hardware processor and memory; and executing a second portion of a hypervisor at a second exception level that prevents the second portion from accessing the data of the virtual machine in the hardware processor and the memory.

DETAILED DESCRIPTION

In accordance with some embodiments, a set of new hypervisor designs, referred to herein as HypSec, is provided that includes a trusted core, referred to herein as the corevisor, and an untrusted host, referred to herein as the hostvisor.

In some embodiments, HypSec can be implemented by retrofitting a commodity hypervisor to significantly reduce the code size of its trusted computing base (TCB) to the content of the corevisor, while maintaining its full functionality using the hostvisor. Alternatively, in some embodiments, HypSec can be implemented by writing a new hypervisor according to some or all of the features described herein.

In some embodiments, HypSec leverages hardware virtualization support to isolate and protect the corevisor and execute it at a higher privilege level than the hostvisor. In some embodiments, rhe corevisor enforces access control to protect data in CPU and memory, but relies on VMs or applications to use end-to-end encrypted I/O to protect I/O data, thereby simplifying the corevisor design.

In some embodiments, the corevisor has full access to hardware resources, provides basic CPU and memory virtualization, and mediates all exceptions and interrupts, ensuring that only a VM and the corevisor can access the VM's data in CPU and memory. More complex operations including I/O and interrupt virtualization, and resource management such as CPU scheduling, memory management, and device management are delegated to the hostvisor, which can also leverage a host OS, in some embodiments. In some embodiments, the hostvisor may import or export encrypted VM data from the system to boot VM images or support hypervisor features such as snapshots and migration, but otherwise has no access to VM data.

Figure 1:
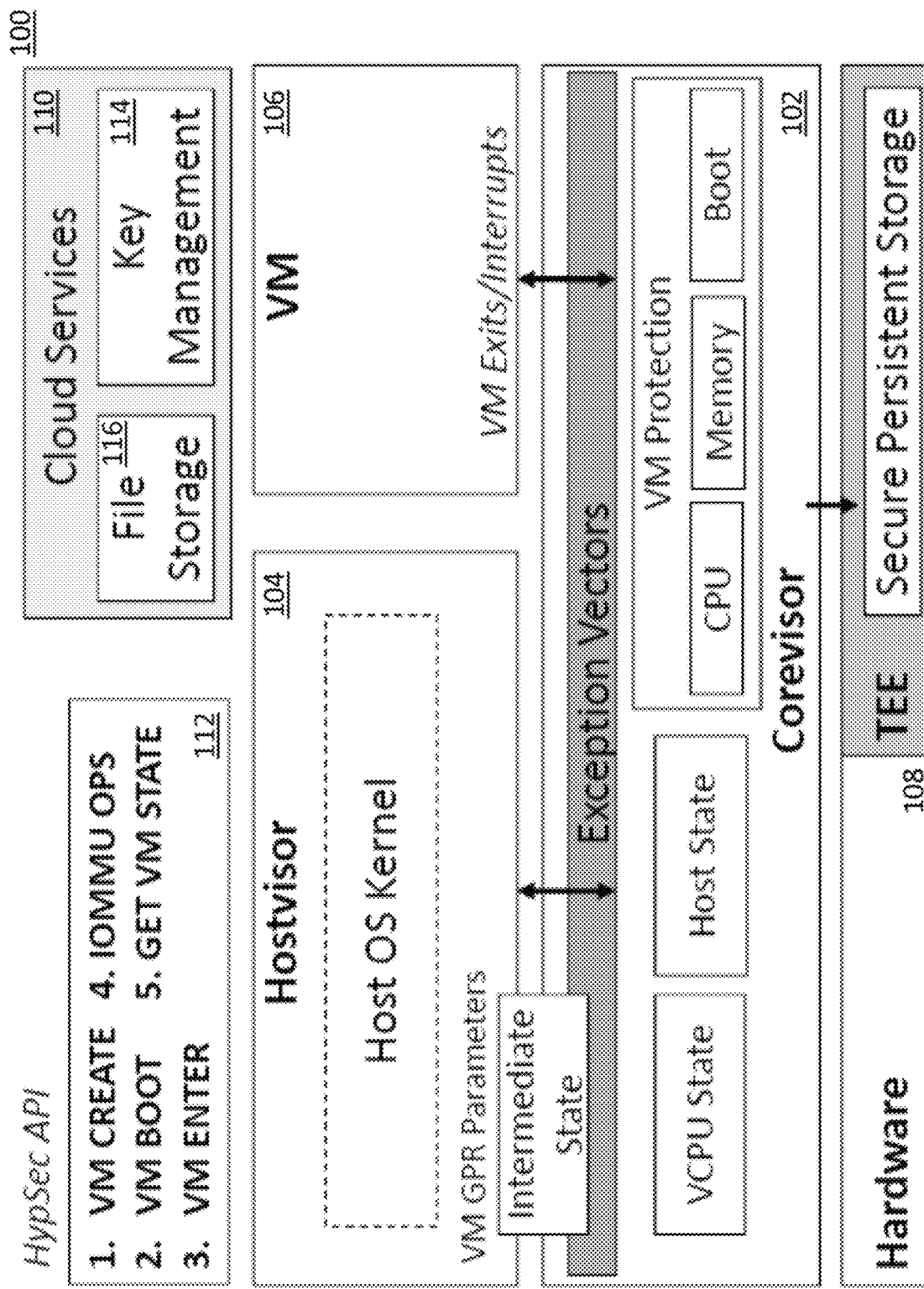
FIG. 1 is an example of a block diagram showing components of a trusted hypervisor in accordance with some embodiments.

Turning to FIG. 1, an example 100 of a block diagram of a system including a corevisor 102, a hostvisor 104, a virtual machine 106, hardware 108, cloud services 110, and a hypervisor application programming interface (API) 112 is illustrated.

In some embodiments, the corevisor can be kept small by only performing certain functions, such as VM data access control and hypervisor functions that require full access to VM data, for example: secure VM boot, CPU virtualization, and page table management. In some embodiments, because VMs and applications can be configured to use secure communication channels to protect I/O data, the hostvisor can provide I/O and interrupt virtualization without risking that communications can be exposed. In some embodiments, the hostvisor also handles other complex functions which do not need access to VM data, including resource management such as CPU scheduling and memory allocation, for example. The hostvisor may even incorporate a full existing OS kernel to support its features in some embodiments.

In some embodiments, HypSec uses hardware virtualization support to enforce the hypervisor partitioning between the corevisor and the hostvisor. More particularly, in some embodiments, HypSec runs the corevisor in a higher privileged CPU mode designed for running hypervisors, giving it full control of hardware, including virtualization hardware mechanisms such as nested page tables (NPTs). In some of these embodiments, the corevisor deprivileges the hostvisor and VM kernel by running them in a less privileged CPU mode. For example, in some embodiments, HypSec can be implemented using ARM Virtualization Extensions (VE), and shown in FIG. 2, the corevisor runs in hypervisor (EL2) mode while the hostvisor and VM kernel run in a less privileged kernel (EL1) mode. The corevisor interposes on all exceptions and interrupts, enabling it to provide access control mechanisms that prevent the hostvisor from accessing VM CPU and memory data. For example, in some embodiments, the corevisor has its own memory and uses nested page tables (NPTs) to enforce memory isolation between the hostvisor, VMs, and itself. In some embodiments, a compromised hostvisor or VM can neither control hardware virtualization mechanisms nor access corevisor memory and thus cannot disable HypSec.

Referring back to FIG. 1, the corevisor exposes an API 112 to the hostvisor and interposes on all hostvisor and VM interactions to ensure secure VM execution throughout the lifecycle of a VM.

Figure 3:
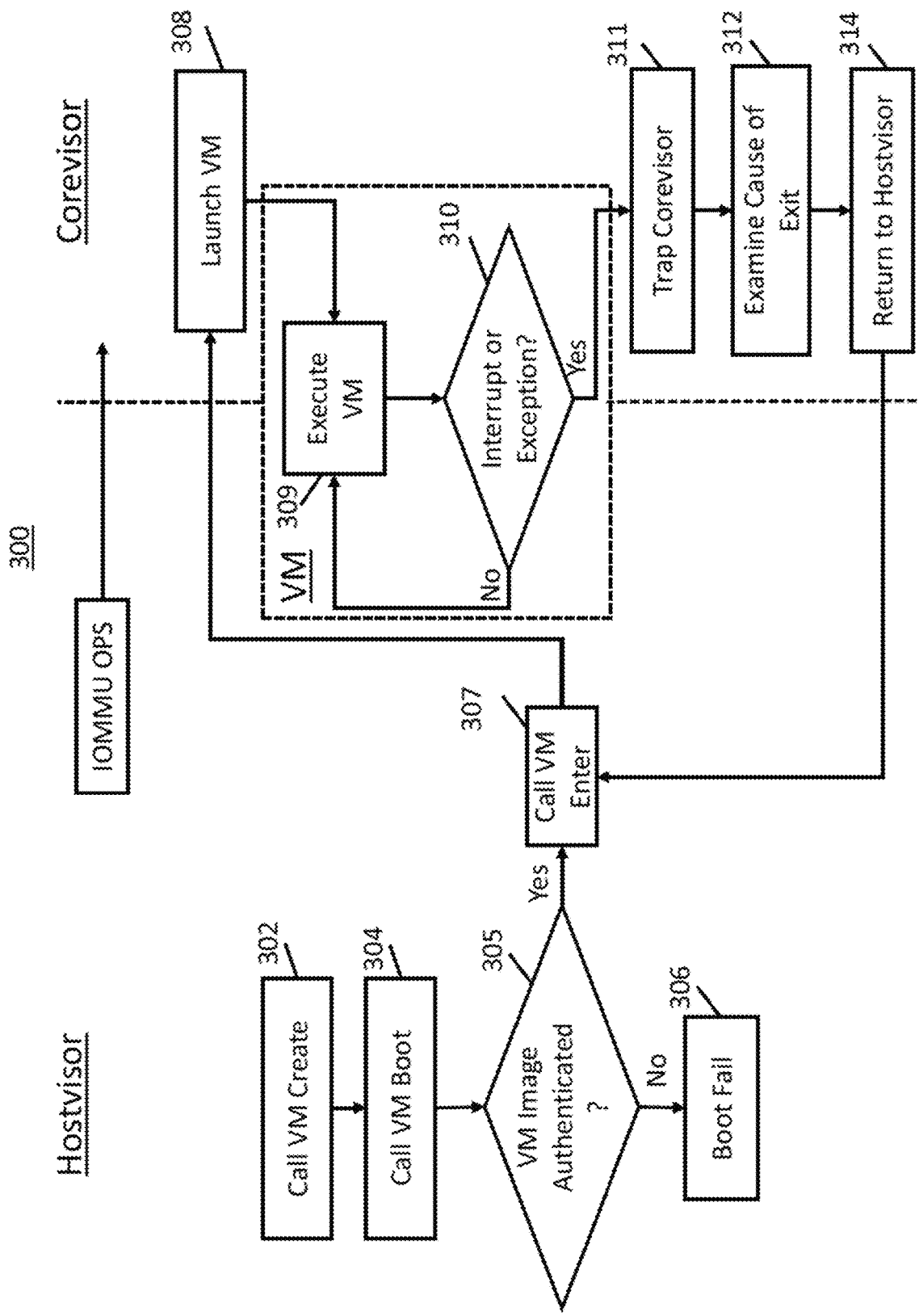
FIG. 3 is an example of a flow diagram showing the booting of a virtual machine in accordance with some embodiments.

As shown in example process 300 of FIG. 3, in some embodiments, the life of a VM begins when the hostvisor calls the corevisor's VM CREATE and VM BOOT calls at 302 and 304, respectively, to safely bootstrap the VM with a verified VM image. If the VM Image is not authenticated at 305, the boot will fail at 306. Otherwise, at 307, the hostvisor (which is deprivileged and cannot execute VMs) calls VM ENTER at 307 to request the corevisor to launch the VM image at 308, thereby causing the VM to execute at 309. In some embodiments, when the VM exits execution because an interrupt or exception occurs at 310, it traps to the corevisor at 311, which examines the cause of the exit at 312 and if needed, will return to the hostvisor at 314.

In some embodiments, the corevisor exposes an input-output memory management unit (IOMMU) operations API to device drivers in the hostvisor for managing the IOMMU, as discussed further below. While the hostvisor has no access to VM data in CPU or memory in some embodiments, the hostvisor may request the corevisor to provide an encrypted copy of VM data via the GET VM STATE hypercall API. The hostvisor can use the API to support virtualization features that require exporting VM data to disk or across the network, such as swapping VM memory to disk or VM management functions like VM snapshot and migration. In some embodiments, the corevisor only uses encryption to export VM data and does not use encryption, rather only access control, to protect VM data in CPU or memory.

In some embodiments, HypSec ensures that the trusted corevisor binary is booted and the bootstrapping code itself is secure. In some embodiments, to ensure only the trusted corevisor binary is booted, HypSec can rely on Unified Extensible Firmware Interface (UEFI) firmware and its signing infrastructure with a hardware root of trust. In some embodiments, the hostvisor and corevisor can be linked as a single HypSec binary which is cryptographically ("digitally") signed by the cloud provider, which can be similar to how OS binaries are signed by vendors like RED HAT, INC. or MICROSOFT CORPORATION, in some embodiments. The HypSec binary can be verified using keys in secure storage provided by the TEE, guaranteeing that only the signed binary can be loaded, in some embodiments.

In some embodiments, HypSec can rely on hostvisor bootstrapping code to install the corevisor securely at boot time since the hostvisor is initially benign. In some embodiments, at boot time, the hostvisor initially has full control of the system to initialize hardware. The hostvisor can install the corevisor before entering user space in some embodiments. After its installation, the corevisor can gain full control of the hardware and subsequently deprivilege the hostvisor, in some embodiments. In some embodiments, using information provided at boot time, the corevisor can be self-contained and can operate without any external data structures.

In some embodiments, HypSec can also guarantee the confidentiality and integrity of VM data during VM boot and initialization. HypSec can delegate complicated boot processes to the untrusted hostvisor, and verify any loaded VM images in the corevisor before they are run. For example, as shown in example process 300 of FIG. 3, and described above, in some embodiments, when a new VM is created, the hostvisor participates with the corevisor in a verified boot process. As part of this process, the hostvisor calls VM CREATE at 302 to request the corevisor to allocate VM state in corevisor memory, including an NPT and VCPU state, and a per virtual CPU (VCPU) data structure. The hostvisor then loads VM images and calls VM BOOT at 304 to request the corevisor to authenticate the loaded VM images. The corevisor then verifies the cryptographic signatures of VM images using public key cryptography at 305. If successful, the hostvisor can then calls VM ENTER at 307 to cause the corevisor to launch the VM image at 308, thereby causing the VM to execute at 309.

In some embodiments, as shown in FIG. 1, both the public keys and VM image signatures can be stored in portions 114 and 116 of TEE secure storage, in some embodiments.

In some embodiments, the VM kernel binary can be detached and mapped separately to memory. In some of such embodiments, the hostvisor can call the corevisor to verify the image.

In some embodiments, the VM kernel binary can be stored in the VM disk image's boot partition. In some of such embodiments, the HypSec-aware virtual firmware can bootstrap the VM. In some embodiments, this firmware can be signed and verified like VM boot images. The firmware can then load the signed kernel binary or a signed bootloader such as GNU GRUB, available at www.gnu.org/software/ grub/manual/grub/grub.html, from the cleartext VM disk partition in some embodiments. The firmware can then call the corevisor to verify the VM kernel binary or bootloader in some embodiments. In the latter case, in some embodiments, the bootloader can verify VM kernel binaries using the signatures on the virtual disk. In some embodiments, when used, GRUB can also use public keys in the signed GRUB binary. In some embodiments, the corevisor can ensure that only images it verified, either a kernel binary, virtual firmware, or a bootloader binary, can be mapped to VM memory. Finally, the corevisor can set the VM program counter to the entry point of the VM image to securely boot the VM, in some embodiments.

As discussed further below, in some embodiments, HypSec can ensure that any password or secret used to decrypt the VM disk is not exposed to the hostvisor. In some embodiments, common encrypted disk formats can use user-provided passwords to protect the decryption keys. In some embodiments, HypSec can store the encrypted key files locally or remotely using a cloud provider's key management service (KMS). For example, in some embodiments, the KMS can maintain a secret key which is preloaded by administrators into hosts' TEE secure storage; and the corevisor can then decrypt the encrypted key file using the secret key, and map the resulting password to VM memory, allowing VMs to obtain the password without exposing it to the hostvisor. In some embodiments, the same key scheme can be used for VM migration. For example, in some embodiments, HypSec can encrypt and decrypt the VM state using the secret key from the KMS.

Hypervisors provide CPU virtualization by performing four main functions: (1) handling traps from VMs; (2) emulating privileged CPU instructions executed by guest OSs to ensure that the hypervisors retain control of CPU hardware; (3) saving and restoring VM CPU state, including general purpose registers (GPRs) and system registers such as page table base registers, as needed when switching among VMs and between a VM and the hypervisor; and (4) scheduling VCPUs on physical CPUs. Hypervisors typically have full access to VM CPU state when performing any of these four functions, which can pose a problem for VM security if the hypervisor is compromised.

In accordance with some embodiments, HypSec protects VM CPU state from the hostvisor by restricting access to VM CPU state to the corevisor while delegating complex CPU functions that can be done without access to VM CPU state to the hostvisor. In some embodiments, this is done by having the corevisor handle all traps from the VM, instruction emulation, and world switches between VMs and the hostvisor, all of which require access to VM CPU state. In some embodiments, VCPU scheduling is delegated to the hostvisor as it can be done without access to VM CPU state.

In some embodiments, the corevisor configures the hardware to route all traps from the VM, as well as interrupts as discussed further below, to go to the corevisor, ensuring that it retains full hardware control. The corevisor also deprivileges the hostvisor to ensure that the hostvisor has no access to corevisor state in some embodiments. Since all traps from the VM go to the corevisor, the corevisor can trap and emulate CPU instructions on behalf of the VM in some embodiments. In some embodiments, the corevisor multiplexes the CPU execution context between the hostvisor and VMs on the hardware. The corevisor maintains VCPU execution context in the VCPU state in-memory data structure allocated on VM CREATE, and maintains the hostvisor's CPU context in a similar Host state data structure in some embodiments Both states are only accessible to the corevisor in some embodiments. On VM exits, in some embodiments, the corevisor first saves the VM execution context from CPU hardware registers to VCPU state, and then restores the hostvisor's execution context from Host state to the CPU hardware registers. In some embodiments, when the hostvisor calls to the corevisor to re-enter the VM, the corevisor first saves its execution context to Host state, and then restores the VM execution context from VCPU state to the hardware. All saving and restoring of VM CPU state is done by the corevisor, and only the corevisor can run a VM, in some embodiments.

In some embodiments, the hostvisor handles VCPU scheduling, which can involve complex scheduling mechanisms especially for multiprocessors. In some embodiments, the hostvisor schedules a VCPU to a physical CPU and calls to the corevisor to run the VCPU, and then the corevisor loads the VCPU state to the hardware.

In some embodiments, HypSec by default ensures that the hostvisor has no access to any VM CPU state. However, sometimes a VM may execute instructions that requiring sharing values with the hostvisor that may be stored in GPRs. For example, if the VM executes a hypercall that includes some parameters and the hypercall is handled by the hostvisor, it will be necessary to pass the parameters to the hostvisor, and those parameters may be stored in GPRs. In these cases, in some embodiments, the instruction will trap to the corevisor, the corevisor will identify the values that need to be passed to the hostvisor, and then the corevisor will copy the values from the GPRs to an in-memory per VCPU intermediate VM state structure that is accessible to the hostvisor. Similarly, hostvisor updates to the intermediate VM state structure can be copied back to GPRs by the corevisor in order to pass values back to the VM in some embodiments. In some embodiments: only values from the GPRs explicitly identified by the corevisor for parameter passing are copied to and from intermediate VM state; and values in other CPU registers are not accessible to the hostvisor.

The corevisor determines if and when to copy values from GPRs, and the GPRs from which to copy, based on the specific CPU instructions executed in some embodiments. In some embodiments, the set of instructions that cause the corevisor to copy values from GPRs are those used to execute hypercalls and special instructions provided by the architecture to access virtual hardware via model-specific registers (MSRs), control registers in the x86 instruction set, or memory-mapped I/O (MMIO).

For example, in some embodiments, on ARM, HypSec copies selected GPRs to and from intermediate VM state for power management hypercalls to the virtual firmware interface and selected MMIO accesses to virtual hardware. For power management hypercalls, in some embodiments, the guest kernel passes input parameters in GPRs, and the corevisor copies only those GPRs to intermediate VM state to make the parameters available to the hostvisor. Upon returning to the VM, in some embodiments, the hostvisor provides output data as return values to the power management hypercalls, which the corevisor copies from intermediate VM state back to GPRs to make them available to the VM. As discussed below, in some embodiments, values stored and loaded in GPRs on MMIO accesses to the virtual interrupt controller interface or I/O devices are also copied between the selected GPRs and the intermediate VM state to make them available to the hostvisor.

In some embodiments, HypSec protects VM memory from the hostvisor by restricting access to VM memory to the corevisor while delegating complex memory management functions that can be done without access to actual VM data in memory to the hostvisor. The corevisor is responsible for memory protection, including configuring NPT hardware, while memory allocation and reclamation is delegated to the hostvisor in some embodiments. HypSec also protects corevisor and VM memory from the hostvisor in some embodiments.

Figure 4:
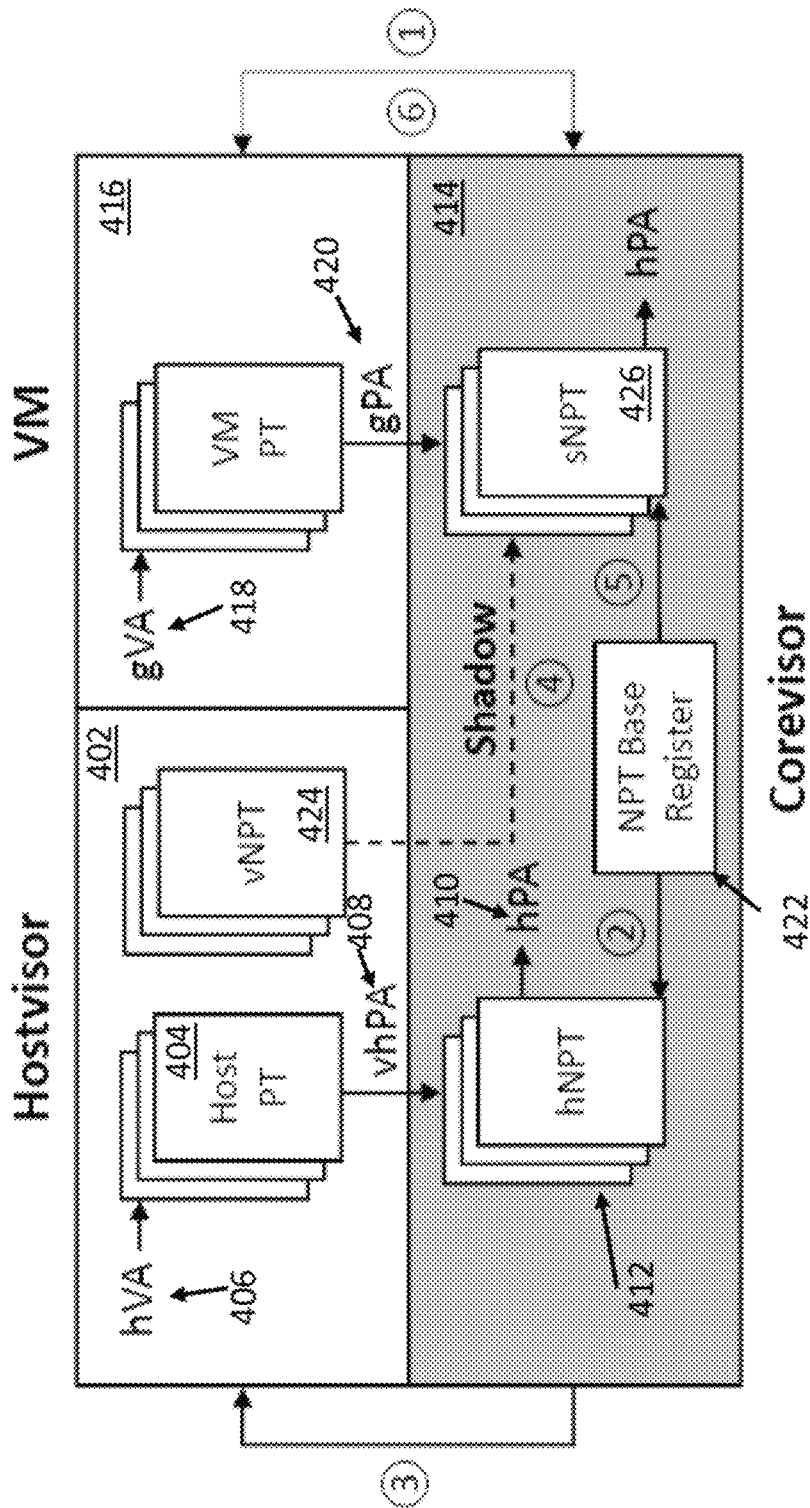
FIG. 4 is an example of a block diagram showing the use of different page tables in accordance with some embodiments.

In some embodiments, the corevisor uses the NPT hardware to virtualize and restrict a VM's access to physical memory. In some embodiments, the corevisor leverages NPTs to isolate hostvisor memory access. For example, in some embodiments, the corevisor configures NPT hardware as shown in FIG. 4. In some of such embodiments, the hostvisor 402 is only allowed to manage its own page tables (Host PT) 404 and can only translate from host virtual memory addresses (hVAs) 406 to virtualized host physical memory addresses (vhPAs) 408. vhPAs 408 are then in turn translated to hPAs 410 by the Host Nested Page Table (hNPT) 412 maintained by corevisor 414 in some embodiments. In some embodiments, corevisor 414 adopts a flat address space mapping; each vhPA 408 is mapped to an identical hPA 410. Hostvisor 402, if granted access, is given the same view of physical memory as corevisor 414 in some embodiments. In some embodiments, corevisor 414 prevents the hostvisor 402 from accessing corevisor memory and VM memory by simply unmapping the memory from hNPT 412 to make the physical memory inaccessible to hostvisor 402. Any hostvisor accesses to corevisor memory or VM memory can trap to corevisor 414, enabling corevisor 414 to intercept unauthorized accesses, in some embodiments. In some embodiments, physical memory can be statically partitioned between hostvisor 402 and corevisor 414, but dynamically allocated between hostvisor 402 and VMs 416 as discussed below. In some embodiments, the corevisor can allocate NPTs from its own memory pool, which is not accessible to the hostvisor. In some embodiments, all VCPU state is also stored in corevisor memory. Corevisor 414 can also protect corevisor memory and VM memory against DMA attacks by retaining control of the IOMMU in some embodiments. For example, in some embodiments, corevisor 414 can allocate IOMMU page tables from its memory and export the IOMMU OPS API to device drivers in hostvisor 402 to update page table mappings. Corevisor 414 can then validate requests and ensure that attackers cannot control the IOMMU to access memory owned by itself or VMs 416.

In some embodiments, the hostvisor can reuse memory allocation functions available in an integrated host OS kernel to dynamically allocate memory from its memory pool to VMs. In some embodiments, HypSec's memory model disallows the hostvisor from managing VM memory and therefore NPTs. The hostvisor instead manages an analogous Virtual NPT (vNPT) for each VM, and HypSec introduces a Shadow Nested Page Table (sNPT) managed by the corevisor for each VM as shown in FIG. 4, in some embodiments. The sNPT can be used to manage the hardware by shadowing the vNPT in some embodiments. The corevisor multiplexes the hardware NPT Base Register between hNPT and sNPT when switching between the hostvisor and a VM in some embodiments.

FIG. 4 depicts an example of steps performed in HypSec's memory virtualization strategy in accordance with some embodiments. As shown, at step 1, when a guest OS tries to map a guest virtual address (gVA) 418 to an unmapped guest physical address (gPA) 420, a nested page fault occurs which traps to corevisor 414. If corevisor 414 finds that the faulted gPA 420 falls within a valid VM memory region, it then points the NPT Base Register 422 to hNPT 412 at step 2, and switches to hostvisor 402 to allocate a physical page for gPA 420 at step 3. The hostvisor allocates a virtualized physical page identified by a vhPA 408 and updates the entry in its vNPT 424 corresponding to the faulting gPA 420 with the allocated vhPA 408. Because vhPA 408 is mapped to an identical hPA 410, hostvisor 402 is able to implicitly manage host physical memory. Hostvisor 402 then traps to corevisor 414 at step 4, which determines the faulting gPA 420 and identifies the updates made by hostvisor 402 to vNPT 424. Corevisor 414 verifies that resulting vhPA 408 is not owned by itself or other VMs (e.g., the latter by tracking ownership of physical memory using a unique VM identifier (VMID)), and copies those updates to its sNPT 426. The corevisor unmaps vhPA 408 from hNPT 412, so that hostvisor 402 no longer has access to the memory being allocated to VM 416. Corevisor 414 updates NPT Base Register 422 to point to sNPT 426 at step 5 and returns to VM 416 at step 6 so that the VM has access to the allocated memory identified by hPA 420 that is identical to vhPA 408.

In some embodiments, HypSec supports VM memory reclamation in the hostvisor while preserving the privacy and integrity of VM data in memory in the corevisor. For example, in some embodiments, when a VM voluntarily releases memory pages, such as on VM termination, the corevisor returns the pages to the hostvisor by first scrubbing the memory pages to ensure the reclaimed memory does not leak VM data, and then mapping the memory pages back to the hNPT so the memory pages are accessible to the hostvisor.

To allow the hostvisor to reclaim VM memory pages without accessing VM data in memory, HypSec can take advantage of a concept of "ballooning" in some embodiments. For example, in some embodiments, ballooning may be implemented as follows. First, a paravirtual "balloon" device is installed in a VM. When the host is low on free memory, the hostvisor then requests the balloon device to "inflate." The balloon driver then inflates by getting memory pages from the free list, thereby increasing the VM's memory pressure. The guest OS may therefore start to reclaim pages or swap its pages to the virtual disk. The balloon driver notifies the corevisor about the pages in its balloon that are ready to be reclaimed. The corevisor then unmaps these pages from the VM's sNPT, scrubs the reclaimed pages to ensure they do not leak VM data, and assigns the pages to the hostvisor, which can then treat them as free memory. Deflating the balloon releases memory pressure in the guest, allowing the guest to reclaim pages.

In some embodiments, HypSec also safely allows the hostvisor to swap VM memory to disk (e.g., when it feels memory pressure). For example, in some embodiments, the hostvisor uses GET_VM_STATE to get access to the encrypted VM page before swapping it out. Later, when the VM page is swapped in, the corevisor unmaps the swapped-in page from hNPT, decrypts the page, and maps it back to the VM's sNPT.

In some embodiments, HypSec by default ensures that the hostvisor has no access to any VM memory, but sometimes a VM may want to share its memory, after encrypting it, with the hostvisor. In some embodiments, HypSec provides GRANT_MEM and REVOKE_MEM hypercalls which can be explicitly used by a guest OS to share its memory and revoke sharing of its memory, respectively, with the hostvisor. As described in below, in some embodiments, this can be used to support paravirtualized I/O of encrypted data in which a memory region owned by the VM can be shared between the VM and hostvisor for communication and efficient data copying. When using these hypercalls, in some embodiments, the VM passes the start of a guest physical frame number (GFN), the size of the memory region, and the specified access permission to the corevisor. The corevisor then enforces the access control policy by controlling the memory region's mapping in hNPT. Only VMs can use these two hypercalls, so the hostvisor cannot use it to request access to arbitrary VM pages.

In some embodiments, HypSec can support advanced memory virtualization features such as merging the same memory pages, kernel same-page merging (KSM) in Linux, by splitting the work into the simple corevisor functions which require direct access to VM data, and the more complicated hostvisor functions which do not require access to VM data. For example, in some embodiments, to support KSM, the hostvisor can request the corevisor to provide hash values of a VM's memory pages and to maintain the data structure in its address space to support the merging algorithm. The corevisor can then validate the hostvisor's decision for the pages to be merged, update the corresponding VM's sNPT, and scrub the freed page before granting the hostvisor access. While KSM does not provide the hostvisor or other VMs direct access to a VM's memory pages, it can be used to leak some information such as whether the contents of memory pages are the same across different VMs. To avoid this kind of information leakage, HypSec can disable KSM support by default in some embodiments.

Hypervisors trap and handle physical interrupts to retain full control of hardware while virtualizing interrupts for VMs. Accesses to hardware interrupt controller interfaces can be done via MSRs or MMIO. Hypervisors provide virtual interrupt controller interfaces and trap and emulate VM access to the hardware interfaces via the virtual interrupt controller interfaces. Virtual devices in the hypervisors can also raise interrupts to the hardware interrupt controller interfaces. However, giving hypervisors full control of hardware poses a problem for VM security if the hypervisor is compromised.

In some embodiments, to protect against a compromised hostvisor, the corevisor configures the hardware to route all physical interrupts and trap all accesses to the hardware interrupt controller to the corevisor, ensuring that it retains full hardware control. However, in some embodiments, HypSec delegates interrupt functionality to the hostvisor, including handling physical interrupts and providing the virtual interrupt controller interface. In some embodiments, before allowing the hostvisor to handle interrupts, the corevisor protects all VM CPU and memory state, as discussed above. In some embodiments, the hostvisor has no access to and requires no VM data to handle physical interrupts. However, in some embodiments, VM accesses to the virtual interrupt controller interface involve passing parameters between the VM and the hostvisor since the hostvisor provides the interface. In some embodiments, on ARM, this can be done using only MMIO via the intermediate state structure discussed in above. For example, on an MMIO write to the interrupt controller interface, the VM passes the value to be stored in a GPR. The write then traps to the corevisor, which identifies the instruction and memory address as corresponding to the interrupt controller interface. Next, the corevisor copies the value to be written from the GPR to the intermediate VM state to make the value available to the hostvisor. For example, when a guest OS in a VM sends an inter-processor interrupt (IPI) to a destination VCPU by doing an MMIO write to the virtual interrupt controller interface, the identifier of the destination VCPU is passed to the hostvisor by copying the value from the respective GPR to the intermediate VM state. Similarly, on an MMIO read from the interrupt controller interface, the read traps to the corevisor, which identifies the instruction and memory address as corresponding to the interrupt controller interface. The corevisor then copies the value from the intermediate VM state updated by the hostvisor to the GPR the VM is using to retrieve the value, updates the PC of the VM to skip the faulting instruction, and returns to the VM.

In some embodiments, HypSec assumes an end-to-end I/O security approach, relying on VMs for I/O protection. VMs can leverage secure communication channels such as TLS/SSL for network communications and full disk encryption for storage. This allows the corevisor to relax its I/O protection requirements in some embodiments. In some embodiments, HypSec offloads the support of I/O virtualization to the untrusted hostvisor. Since I/O data is assumed to be already encrypted by VMs, a compromised hostvisor would at most gain access to encrypted I/O data which would not reveal VM data in some embodiments.

In some embodiments, HypSec supports all three classes of I/O devices: (1) emulated; (2) paravirtualized; and (3) passthrough devices; the latter two provide better I/O performance.

In some embodiments, emulated I/O devices can be supported using trap-and-emulate to handle both port-mapped I/O (PIO) and MMIO operations. In both cases, HypSec configures the hardware to trap the operations to the corevisor which hides all VM data other than actual I/O data and then allows the hostvisor to emulate the operation, in some embodiments. For example, to support MMIO, in some embodiments, the corevisor zeroes out the mappings for addresses in the VM's sNPT that correspond to virtual device I/O regions. Any subsequent MMIO accesses from the VM result in a memory access fault that traps to the corevisor in some embodiments. The corevisor then securely supports MMIO accesses as discussed above in some embodiments.

In some embodiments, paravirtualized devices require that a front-end driver in the VM coordinate with a back-end driver in the hypervisor, and the two drivers communicate through shared memory asynchronously. In some embodiments, HypSec allows back-end drivers to be installed as part of the untrusted hostvisor. To support shared memory communication, in some embodiments, the front-end driver is modified to use GRANT_MEM and REVOKE_MEM hypercalls to identify the shared data structure and I/O memory buffers as accessible to the hostvisor back-end driver. Since the I/O data is encrypted, in some embodiments, hostvisor access to the I/O memory buffers does not risk VM data.

In some embodiments, passthrough devices are assigned to a VM and managed by the guest OS. To support pass-through I/O, in some embodiments, HypSec configures the hardware to trap sensitive operations such as Message Signaled Interrupt (MSI) configuration in base address register (BAR) to trap to the corevisor for secure emulation, while granting VMs direct access to the non-sensitive device memory region. The corevisor controls the IOMMU to enforce inter-device isolation, and ensures the passthrough device can only access the VM's own I/O buffer, in some embodiments.

In some embodiments, HypSec requires a higher-privileged CPU mode, nested page tables for memory virtualization, and an IOMMU for DMA protection. In some embodiments, these requirements can be satisfied by the ARM architecture. ARM VE provides Hyp (EL2) mode for hypervisors that is strictly more privileged than user (EL0) and kernel (EL1) modes. EL2 has its own execution context defined by register and control state, and can therefore switch the execution context of both EL0 and EL1 in software. Thus, HypSec can run in an address space that is isolated from EL0 and EL1. ARM VE provides stage 2 page tables which are nested level page tables configured in EL2 that affect software in EL0 and EL1. ARM provides the System Memory Management Unit (SMMU) [8] to protect DMA.

In some embodiments when implement in an ARM VE architecture, HypSec's corevisor is initialized at machine bootup and runs in EL2 to fully control the hardware; HypSec's code is embedded in the Linux kernel binary, which is verified and loaded via UEFI; the kernel boots in EL2 and installs a trap handler to later return to EL2; the kernel then enters EL1 so the hostvisor can bootstrap the machine; the hostvisor allocates resources and configures the hardware for the corevisor; and the hostvisor then makes a hypercall to the corevisor in EL2 to enable HypSec.

Figure 2:
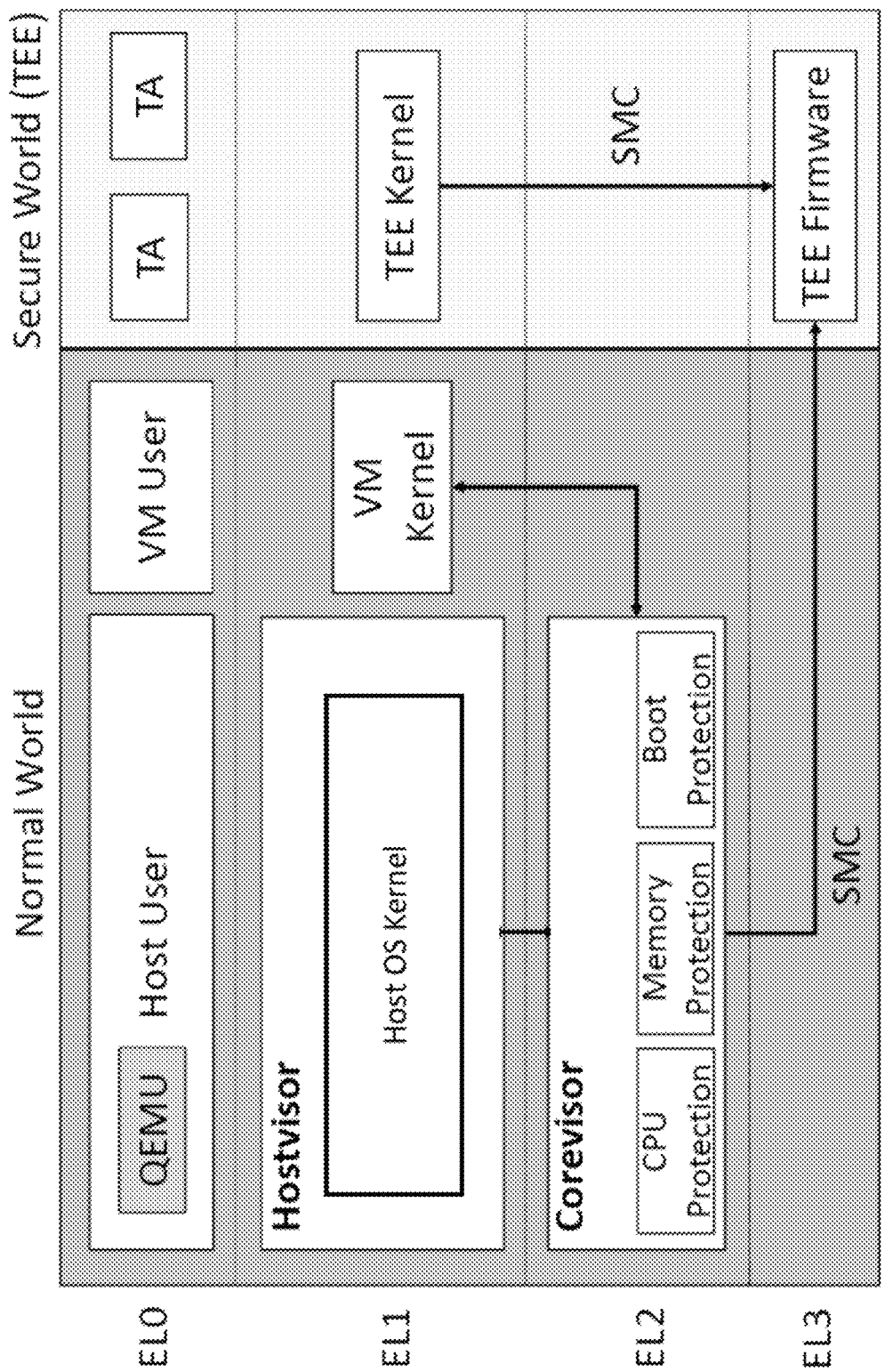
FIG. 2 is an example of a block diagram showing different components of a trusted hypervisor, a virtual machine, and a trusted execution environment operating at different exception levels in accordance with some embodiments.

As shown in FIG. 2, in some embodiments for example, the corevisor runs in EL2 and the hostvisor, including a Linux OS kernel, runs in EL1. The hostvisor has no access to EL2 registers and cannot compromise the corevisor or disable VM protection in some embodiments. In this example, HypSec leverages ARM VE to force VM operations that need hypervisor intervention to trap into EL2. The corevisor either handles the trap directly to protect VM data or world switches the hardware to EL1 to run the hostvisor if more complex handling is necessary. When the hostvisor finishes its work, it makes a hypercall to trap to EL2 so that the corevisor can securely restore the VM state to hardware. In some embodiments, the corevisor interposes on every switch between the VM and hostvisor, thus protecting the VM's execution context.

In some embodiments, HypSec leverages ARM VE's stage 2 memory translation support to virtualize VM memory and prevent accesses to protected physical memory. The corevisor routes stage 2 page faults to EL2 and rejects illegal hostvisor and VM memory accesses. The corevisor allocates hNPTs and VMs' sNPTs from its protected physical memory and manages the page tables.

In some embodiments, to secure DMA, the corevisor uses trap-and-emulate on hostvisor accesses to the SMMU. HypSec ensures only the corevisor has access to the SMMU hardware in some embodiments. The corevisor manages the SMMU page tables in its protected memory to ensure hostvisor devices cannot access corevisor or VM memory, and devices assigned to the VM can only access VM memory in some embodiments.

In some embodiments, HypSec's hardware requirements can also be satisfied on Intel's x86 architecture by using Virtual Machine Extensions (VMX) and the IOMMU. In some embodiments, the hostvisor runs in VMX non-root operation to provide resource management and virtual I/O, and the corevisor protects VM execution state by managing a Virtual-Machine Control Structure (VMCS) per CPU, and VM memory by using Extended Page Tables (EPT) and controlling the IOMMU.

In accordance with some embodiments, HypSec provides at least the following nine properties.

Property 1: In some embodiments, HypSec's corevisor can be trusted during the system's lifetime against remote attackers.

For example, as described above, in some embodiments, HypSec provides the benefits described in this paragraph. HypSec leverages hardware secure boot to ensure only the signed and trusted HypSec binary can be booted. This prevents an attacker from trying to boot or reboot the system to force it to load a malicious corevisor. The hostvisor securely installs the corevisor during the boot process before network access and serial input service are available. Thus, remote attackers cannot compromise the hostvisor prior to or during the installation of the corevisor. The corevisor protects itself after initialization. It runs in a privileged CPU mode using a separate address space from the hostvisor and the VMs. The corevisor has full control of the hardware including the virtualization features that prevent attackers from disabling its VM protection. The corevisor also protects its page tables so an attacker cannot map executable memory to the corevisor's address space.

Property 2: In some embodiments, HypSec ensures that only trusted VM images can be booted on VMs.

For example, as described above, in some embodiments, HypSec provides the benefits described in this paragraph. Based on Property 1, the trusted corevisor verifies the signatures of the VM images loaded to VM memory before they are booted. The public keys and signatures are stored using TEE APIs for persistent secure storage. A compromised hostvisor therefore cannot replace a verified VM with a malicious one.

Property 3: In some embodiments, HypSec isolates a given VM's memory from all other VMs and the hostvisor.

For example, as described above, in some embodiments, HypSec provides the benefits described in this paragraph. Based on Property 1, HypSec prevents the hostvisor and a given VM from accessing memory owned by other VMs. The corevisor tracks ownership of physical pages and enforces inter-VM memory isolation using nested paging hardware. While a compromised hostvisor could control a DMA capable device to attempt to access VM memory or compromise the corevisor, the corevisor controls the IOMMU and its page tables, so the hostvisor cannot access corevisor or VM memory via DMA. VM pages reclaimed by the hostvisor are scrubbed by the corevisor, so they do not leak VM data. HypSec also protects the integrity of VM nested page tables. The corevisor manages shadow page tables for VMs. The MMU can only walk the shadow page tables residing in a protected memory region only accessible to the corevisor. The corevisor manages and verifies updates to the shadow page tables to protect VM memory mappings.

Property 4: In some embodiments, HypSec protects a given VM's CPU registers from the hostvisor and all other VMs.

For example, as described above, in some embodiments, HypSec provides the benefits described in this paragraph. HypSec protects VM CPU registers by only granting the trusted corevisor (Property 1) full access to them. The hostvisor cannot access VM registers without permission. Attackers cannot compromise VM execution flow since only the corevisor can update VM registers including program counter (PC), link register (LR), and TTBR.

Property 5: In some embodiments, HypSec protects the confidentiality of a given VM's I/O data against the hostvisor and all other VMs assuming the VM employs an end-to-end approach to secure I/O.

For example, as described above, in some embodiments, HypSec provides the benefits described in this paragraph. Based on Properties 3 and 4, HypSec protects any I/O encryption keys loaded to VM CPU registers or memory, so a compromised hostvisor cannot steal these keys to decrypt encrypted I/O data. The same protection holds against other VMs.

Property 6: In some embodiments, HypSec protects the confidentiality and integrity of a given VM's I/O data against the hostvisor and all other VMs assuming the VM employs an end-to-end approach to secure I/O and the I/O can be verified before it permanently modifies the VM's I/O data.

For example, as described above, in some embodiments, HypSec provides the benefits described in this paragraph. Using the reasoning in Property 5 with the additional assumption that I/O can be verified before it permanently modifies I/O data, HypSec also protects the integrity of VM I/O data, as any tampered data will be detected and can be discarded. For example, a network endpoint receiving I/O from a VM over an encrypted channel with authentication can detect modifications of the I/O data by any intermediary such as the hostvisor.

Property 7: In some embodiments, assuming a VM takes an end-to-end approach for securing its I/O, HypSec protects the confidentiality of all of the VM's data against a remote attacker, including if the attacker compromises any other VMs or the hostvisor itself.

For example, as described above, in some embodiments, HypSec provides the benefits described in this paragraph. Based on Properties 1, 3, and 4, a remote attacker cannot compromise the corevisor, and any compromise of the hostvisor or another VM cannot allow the attacker to access VM data stored in CPU registers or memory. This combined with Property 5 allows HypSec to ensure the confidentiality of all of the VM's data.

Property 8: In some embodiments, under the assumption that a VM takes an end-to-end approach for securing its I/O and I/O can be verified before it permanently modifies any VM data, HypSec protects the integrity of all of the VM's data against a remote attacker, including if the attacker compromises any other VMs or the hostvisor itself.

For example, as described above, in some embodiments, HypSec provides the benefits described in this paragraph. Based on Properties 1, 3, and 4, HypSec ensures a remote attacker cannot compromise the corevisor, and that any compromise of the hostvisor or another VM cannot allow the attacker to access VM data stored in CPU registers or memory, thereby preserving VM CPU and memory data integrity. This combined with Property 6 allows HypSec to ensure the integrity of all of the VM's data.

Property 9: In some embodiments, if the hypervisor is benign and responsible for handling I/O, HypSec protects the confidentiality and integrity of all of the VM's data against any compromises of other VMs.

For example, as described above, in some embodiments, HypSec provides the benefits described in this paragraph. If both the hostvisor and corevisor are not compromised and the hostvisor is responsible for handling I/O, then the confidentiality and integrity of a VM's I/O data will be protected against other VMs. This combined with Properties 3 and 4 allows HypSec to ensure the confidentiality and integrity of all of the VM's data.

In some embodiments, HypSec can be implemented on ARM server hardware with VE support, specifically a 64-bit ARMv8 AMD Seattle (Rev.B0) server with 8 Cortex-A57 CPU cores, 16 GB of RAM, a 512 GB SATA3 HDD for storage, an AMD 10 GbE (AMD XGBE) NIC device, and an IOMMU (SMMU-401) to support control over DMA devices and direct device assignment. Any other suitable hardware can be used in some embodiments.

Figure 5:
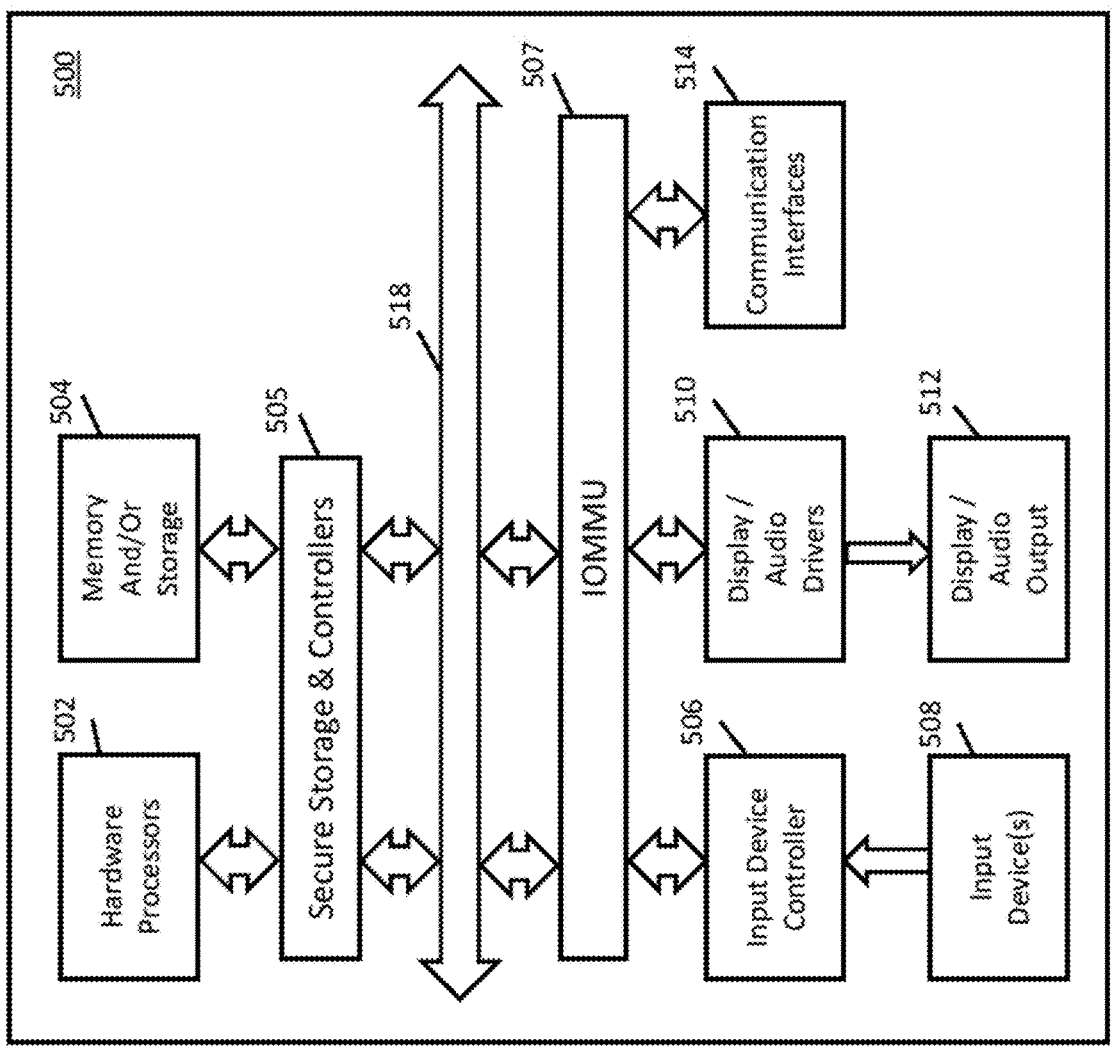
FIG. 5 is an example of a block diagram showing hardware that can be used in accordance with some embodiments.

For example, in some embodiments HypSec can be implemented using any suitable general-purpose computer or special-purpose computer. For example, a server can be implemented using a special-purpose computer. Any such general-purpose computer or special-purpose computer can include any suitable hardware. For example, as illustrated in example hardware 500 of FIG. 5, such hardware can include hardware processors 502, memory and/or storage 504, secure storage and controllers 505, an IOMMU 507, an input device controller 506, an input device 508, display/audio drivers 510, display and audio output circuitry 512, communication interface(s) 514, and a bus 518.

Hardware processor 502 can include any suitable hardware processor, such as a microprocessor, a micro-controller, digital signal processor(s), dedicated logic, and/or any other suitable circuitry for controlling the functioning of a general-purpose computer or a special purpose computer in some embodiments.

Memory and/or storage 504 can be any suitable memory and/or storage for storing programs, data, and/or any other suitable information in some embodiments. For example, memory and/or storage 504 can include random access memory, read-only memory, flash memory, hard disk storage, optical media, and/or any other suitable memory.

Secure storage and controllers 505 can be any suitable secure storage and controllers in some embodiments. For example, secure storage and controllers 505 can be secure storage and controllers that control the hardware processors' access to hardware resources like memory and storage.

IOMMU 507 can be any suitable IOMMU in some embodiments. For example, in some embodiments, IOMMY 507 can be an IOMMU that provides memory translation for devices which a software system can use to protect device's accesses.

Input device controller 506 can be any suitable circuitry for controlling and receiving input from input device(s) 508 in some embodiments. For example, input device controller 506 can be circuitry for receiving input from an input device 508, such as a touch screen, from one or more buttons, from a voice recognition circuit, from a microphone, from a camera, from an optical sensor, from an accelerometer, from a temperature sensor, from a near field sensor, and/or any other type of input device.

Display/audio drivers 510 can be any suitable circuitry for controlling and driving output to one or more display/audio output circuitries 512 in some embodiments. For example, display/audio drivers 510 can be circuitry for driving one or more display/audio output circuitries 512, such as an LCD display, a speaker, an LED, or any other type of output device.

Communication interface(s) 514 can be any suitable circuitry for interfacing with one or more communication networks. For example, interface(s) 514 can include network interface card circuitry, wireless communication circuitry, and/or any other suitable type of communication network circuitry.

Any other suitable components can additionally or alternatively be included in hardware 500 in accordance with some embodiments.

It should be understood that at least some of the above described blocks of the processes of FIGS. 3 and 4 can be executed or performed in any order or sequence not limited to the order and sequence shown in and described in the figures. Also, some of the above blocks of the processes of FIGS. 3 and 4 can be executed or performed substantially simultaneously where appropriate or in parallel to reduce latency and processing times. Additionally or alternatively, some of the above described blocks of the processes of FIGS. 3 and 4 can be omitted.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory magnetic media (such as hard disks, floppy disks, and/or any other suitable magnetic media), non-transitory optical media (such as compact discs, digital video discs, Blu-ray discs, and/or any other suitable optical media), non-transitory semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system comprising:
a memory; and
a hardware processor coupled to the memory and configured to:
execute a hypervisor having a first portion and a second portion, wherein the first portion of the hypervisor executes at a first exception level and is able to access data of a virtual machine in the hardware processor and the memory, and wherein the second portion of the hypervisor executes at a second exception level and accesses the data of the virtual machine in the hardware processor and the memory using a first page table that translates a host virtual address to a virtualized host physical address and a second page table that translates the virtualized host physical address to a host physical address, wherein the second page table is controlled by the first portion of the hypervisor; and
unmapping physical memory from the second page table by the first portion of the hypervisor to prevent the second portion of the hypervisor from accessing the physical memory.

2. The system of claim 1, wherein the first portion uses a nested page table to enforce memory isolation between the first portion, the second portion, and the virtual machine.

3. The system of claim 1, wherein the first portion authenticates an image of the virtual machine before booting the virtual machine.

4. The system of claim 1, wherein the second portion calls a function of the first portion that causes the first portion to authenticate the image of the virtual machine.

5. The system of claim 1, wherein the second portion installs and boots the first portion.

6. The system of claim 5, wherein the first portion deprivileges the second portion after being booted.

7. The system of claim 1, wherein the second portion schedules a virtual central processing unit (CPU) to a physical CPU and calls the first portion to run the virtual CPU.

8. A method comprising:
executing a first portion of a hypervisor at a first exception level, wherein the first portion is able to access data of a virtual machine in a hardware processor and a memory;
executing a second portion of a hypervisor at a second exception level, wherein the second portion accesses the data of the virtual machine in the hardware processor and the memory using a first page table that translates a host virtual address to a virtualized host physical address and a second page table that translates the virtualized host physical address to a host physical address, wherein the second page table is controlled by the first portion of the hypervisor; and
unmapping physical memory from the second page table by the first portion of the hypervisor to prevent the second portion of the hypervisor from accessing the physical memory.

9. The method of claim 8, wherein the first portion uses a nested page table to enforce memory isolation between the first portion, the second portion, and the virtual machine.

10. The method of claim 8, wherein the first portion authenticates an image of the virtual machine before booting the virtual machine.

11. The method of claim 8, wherein the second portion calls a function of the first portion that causes the first portion to authenticate the image of the virtual machine.

12. The method of claim 8, wherein the second portion installs and boots the first portion.

13. The method of claim 12, wherein the first portion deprivileges the second portion after being booted.

14. The method of claim 8, wherein the second portion schedules a virtual central processing unit (CPU) to a physical CPU and calls the first portion to run the virtual CPU.

15. A non-transitory computer-readable medium containing computer executable instructions that, when executed by a processor, cause the processor to perform a method, the method comprising: comprising:
executing a first portion of a hypervisor at a first exception level, wherein the first portion is able to access data of a virtual machine in a hardware processor and a memory; executing a second portion of a hypervisor at a second exception level, wherein the second portion accesses the data of the virtual machine in the hardware processor and the memory using a first page table that translates a host virtual address to a virtualized host physical address and a second page table that translates the virtualized host physical address to a host physical address, wherein the second page table is controlled by the first portion of the hypervisor; and
unmapping physical memory from the second page table by the first portion of the hypervisor to prevent the second portion of the hypervisor from accessing the physical memory.

16. The non-transitory computer-readable medium of claim 15, wherein the first portion uses a nested page table to enforce memory isolation between the first portion, the second portion, and the virtual machine.

17. The non-transitory computer-readable medium of claim 15, wherein the first portion authenticates an image of the virtual machine before booting the virtual machine.

18. The non-transitory computer-readable medium of claim 15, wherein the second portion calls a function of the first portion that causes the first portion to authenticate the image of the virtual machine.

19. The non-transitory computer-readable medium of claim 15, wherein the second portion installs and boots the first portion.

20. The non-transitory computer-readable medium of claim 19, wherein the first portion deprivileges the second portion after being booted.

21. The non-transitory computer-readable medium of claim 15, wherein the second portion schedules a virtual central processing unit (CPU) to a physical CPU and calls the first portion to run the virtual CPU.

* * * * *